United States Patent
Umeda

(10) Patent No.: US 10,057,445 B2
(45) Date of Patent: Aug. 21, 2018

(54) IMAGE FORMING APPARATUS AND CONTROL METHOD OF IMAGE FORMING APPARATUS

(71) Applicant: CANON KABUSHIKI KAISHA, Tokyo (JP)

(72) Inventor: Yoshinobu Umeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/991,370

(22) Filed: Jan. 8, 2016

(65) Prior Publication Data

US 2016/0219174 A1    Jul. 28, 2016

(30) Foreign Application Priority Data

Jan. 28, 2015  (JP) ................................. 2015-014558

(51) Int. Cl.
| | |
|---|---|
| *G06K 15/00* | (2006.01) |
| *H04N 1/00* | (2006.01) |
| *H04N 1/44* | (2006.01) |
| *G06K 9/00* | (2006.01) |

(52) U.S. Cl.
CPC ..... *H04N 1/00891* (2013.01); *G06K 9/00369* (2013.01); *H04N 1/00896* (2013.01); *H04N 1/4426* (2013.01)

(58) Field of Classification Search
None
See application file for complete search history.

(56) References Cited

U.S. PATENT DOCUMENTS

| | | | | |
|---|---|---|---|---|
| 2010/0231390 | A1* | 9/2010 | Hashimoto | G03G 15/5004 340/573.1 |
| 2014/0075230 | A1 | 3/2014 | Suggs et al. | |
| 2014/0157032 | A1* | 6/2014 | Yokoyama | G06F 1/3215 713/323 |
| 2014/0300917 | A1* | 10/2014 | Ito | G03G 15/5004 358/1.14 |
| 2014/0368855 | A1 | 12/2014 | Yamano | |
| 2015/0161493 | A1* | 6/2015 | Wilsher | G06K 15/406 358/1.14 |
| 2015/0234474 | A1* | 8/2015 | Yokoyama | G06F 1/26 713/323 |

(Continued)

FOREIGN PATENT DOCUMENTS

| | | |
|---|---|---|
| CN | 103562818 A | 2/2014 |
| CN | 104243746 A | 12/2014 |
| JP | 2011-112309 A | 6/2011 |

(Continued)

OTHER PUBLICATIONS

May 25, 2018 Office Action in Chinese Patent Application No. 201610060347.4 (with English translation).

*Primary Examiner* — Dung D Tran
(74) *Attorney, Agent, or Firm* — Fitzpatrick, Cella, Harper & Scinto

(57) ABSTRACT

When detection intensity by an object detection sensor is larger than a first threshold, a user is notified that the object detection sensor has detected an object. When detection intensity by the object detection sensor is larger than a second threshold which is larger than the first threshold, an image forming apparatus is recovered to a state capable of executing a function the image forming apparatus.

10 Claims, 17 Drawing Sheets

(56) References Cited

U.S. PATENT DOCUMENTS

2016/0070222 A1* 3/2016 Fukushima ........ G03G 15/5004
399/88
2016/0277599 A1* 9/2016 Nagasawa .......... H04N 1/00084

FOREIGN PATENT DOCUMENTS

| JP | 2012-017796 A | 1/2012 |
| JP | 2012-203132 A | 10/2012 |

* cited by examiner

FIG. 1
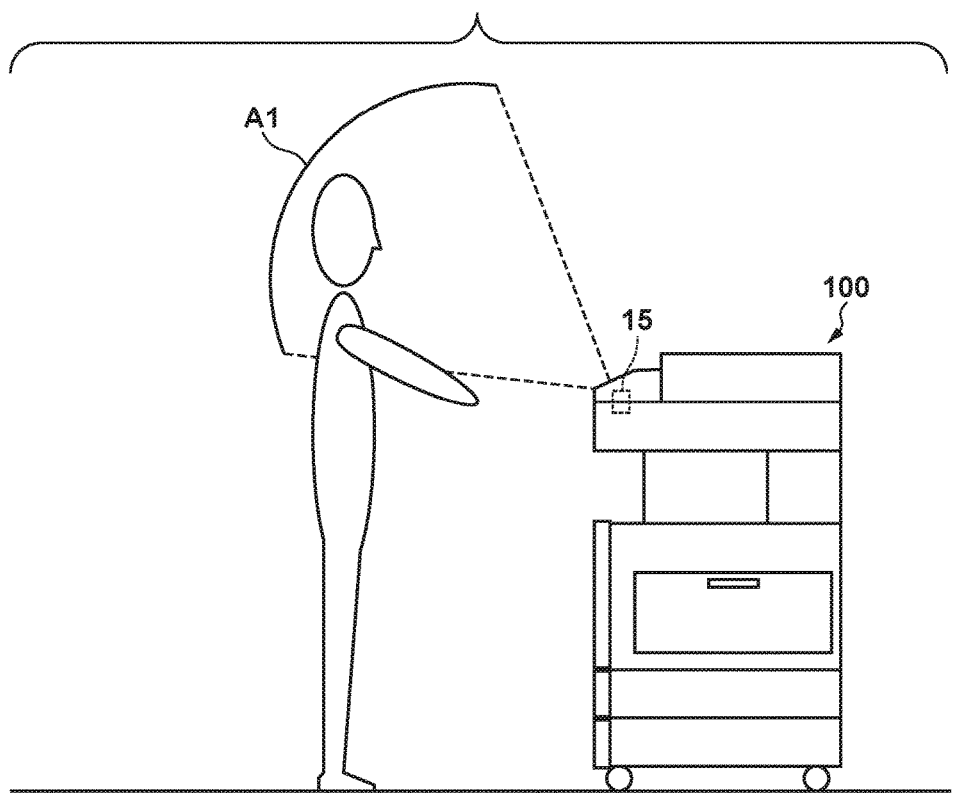
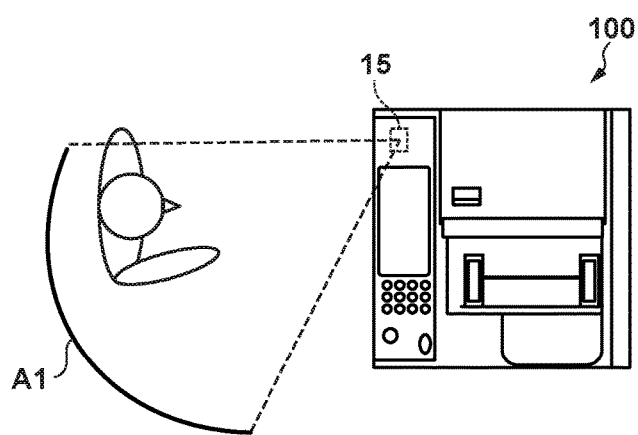

<POWER SAVING STATE>

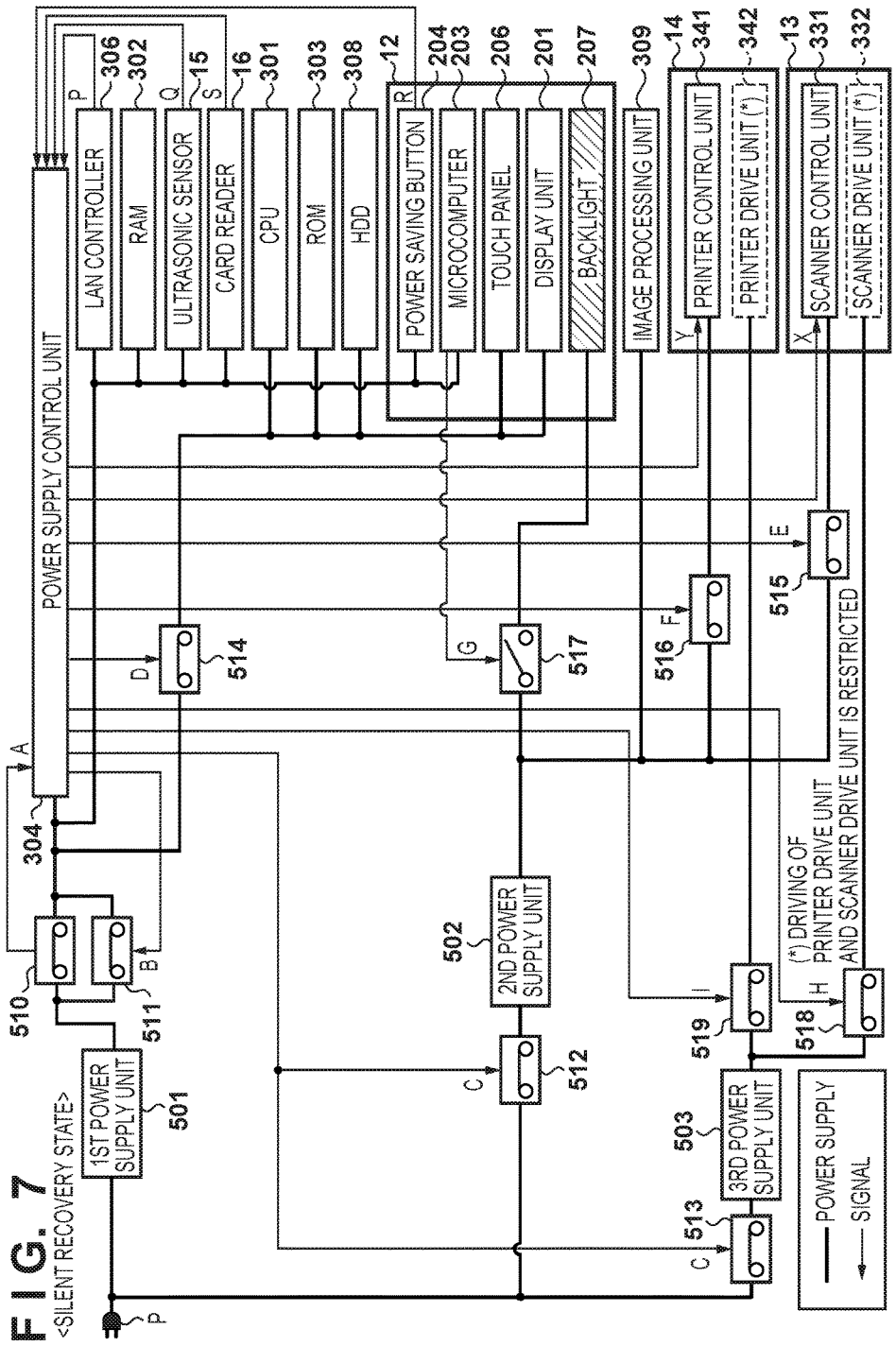

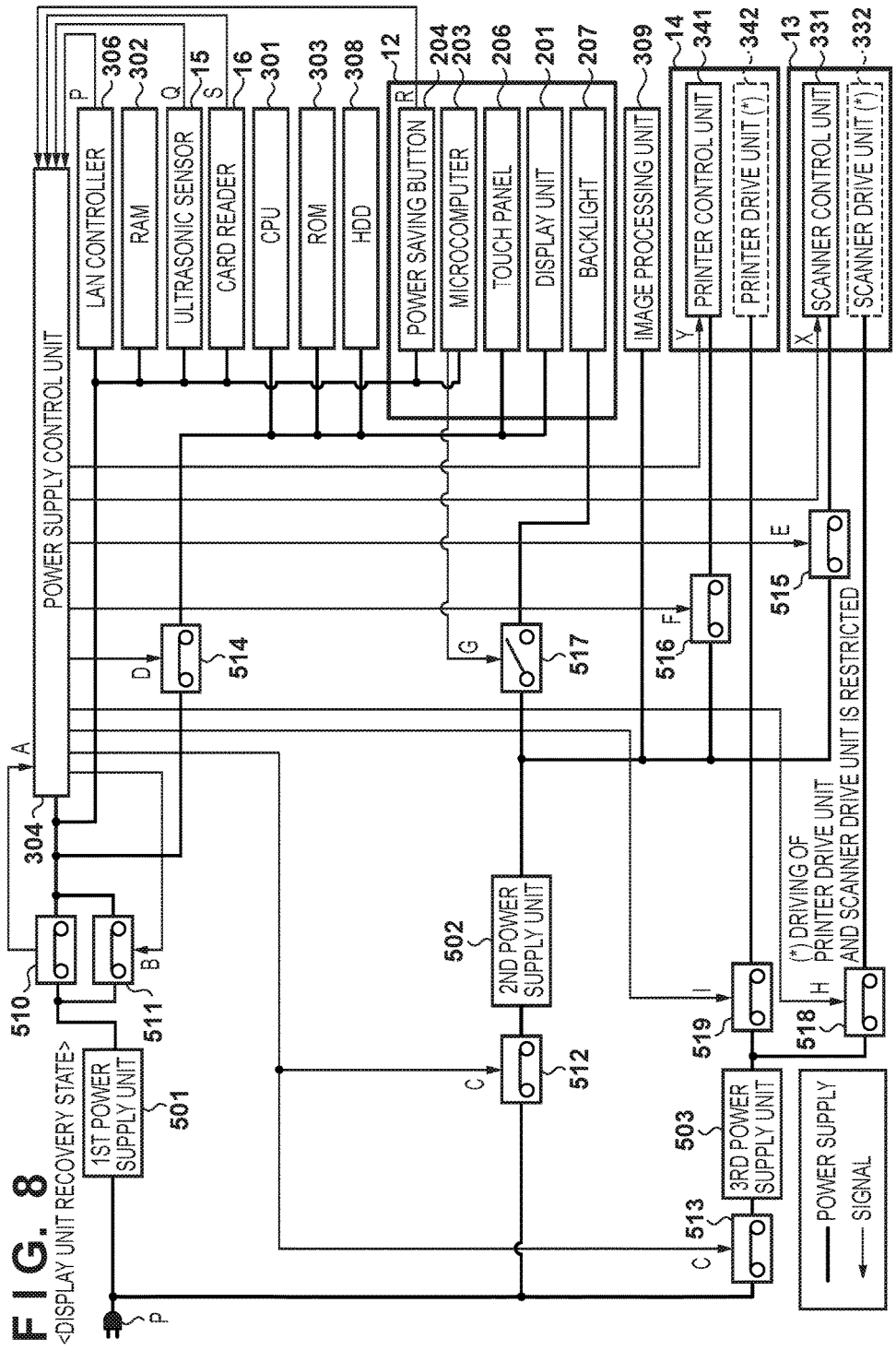

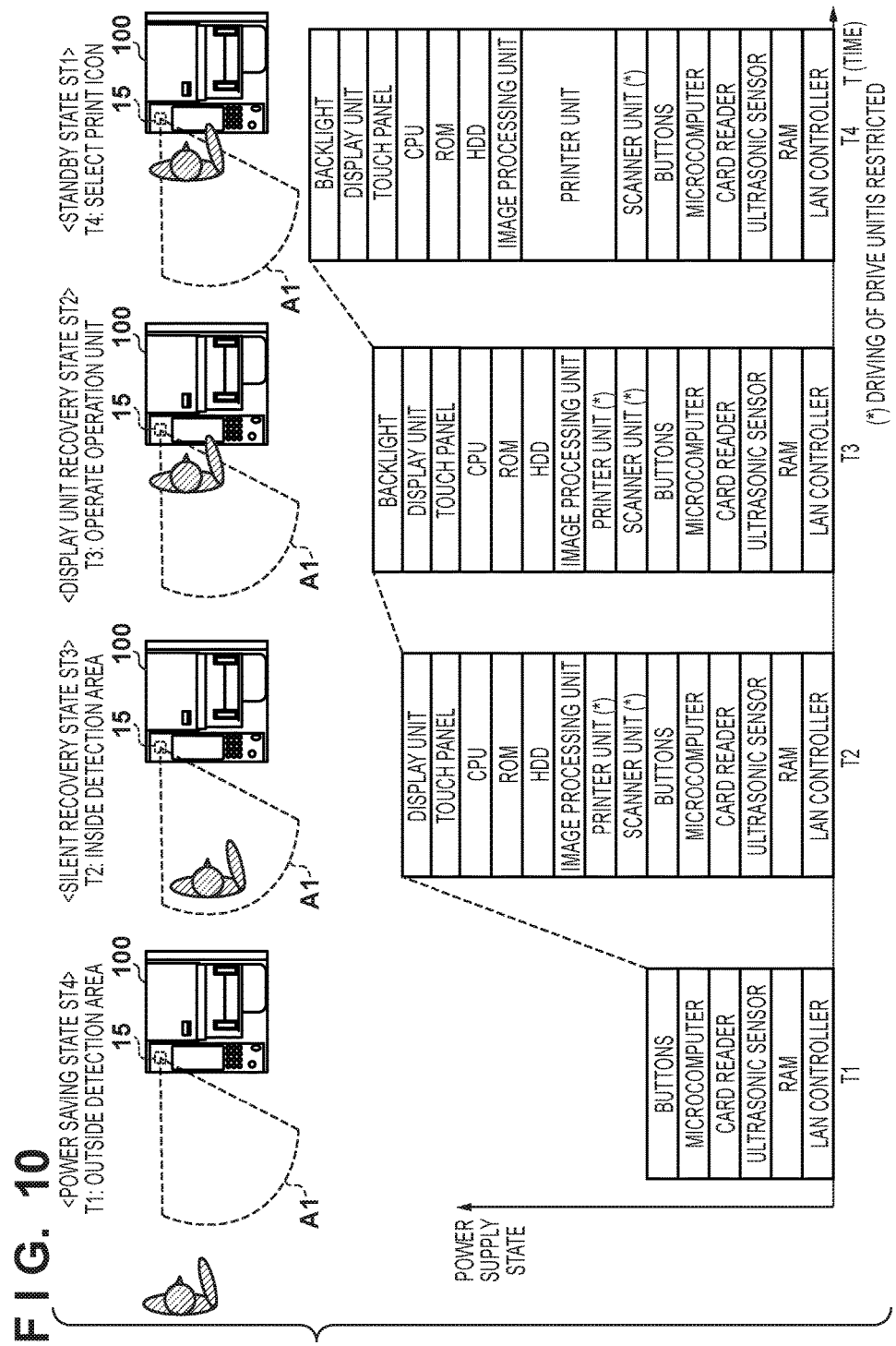

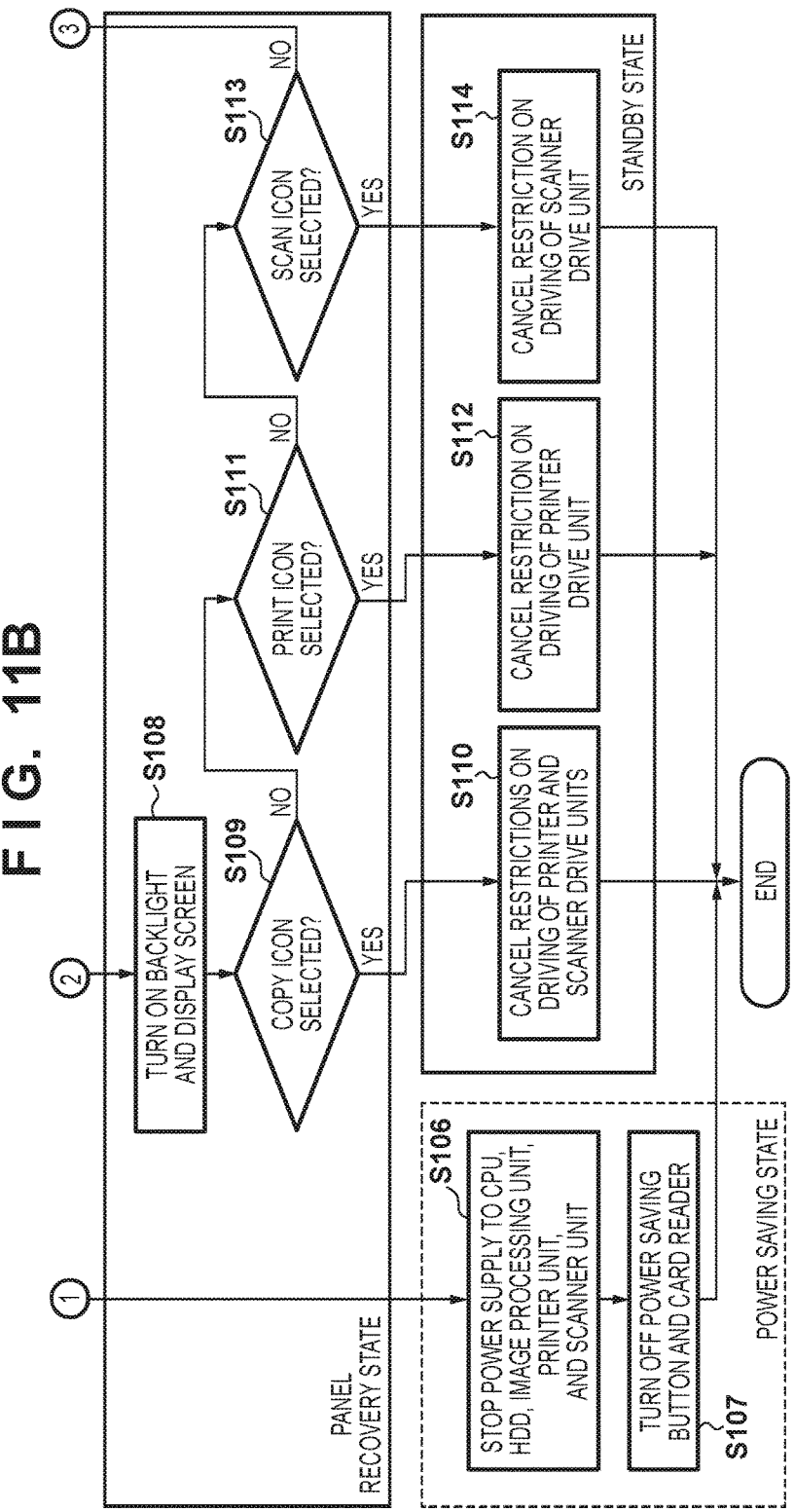

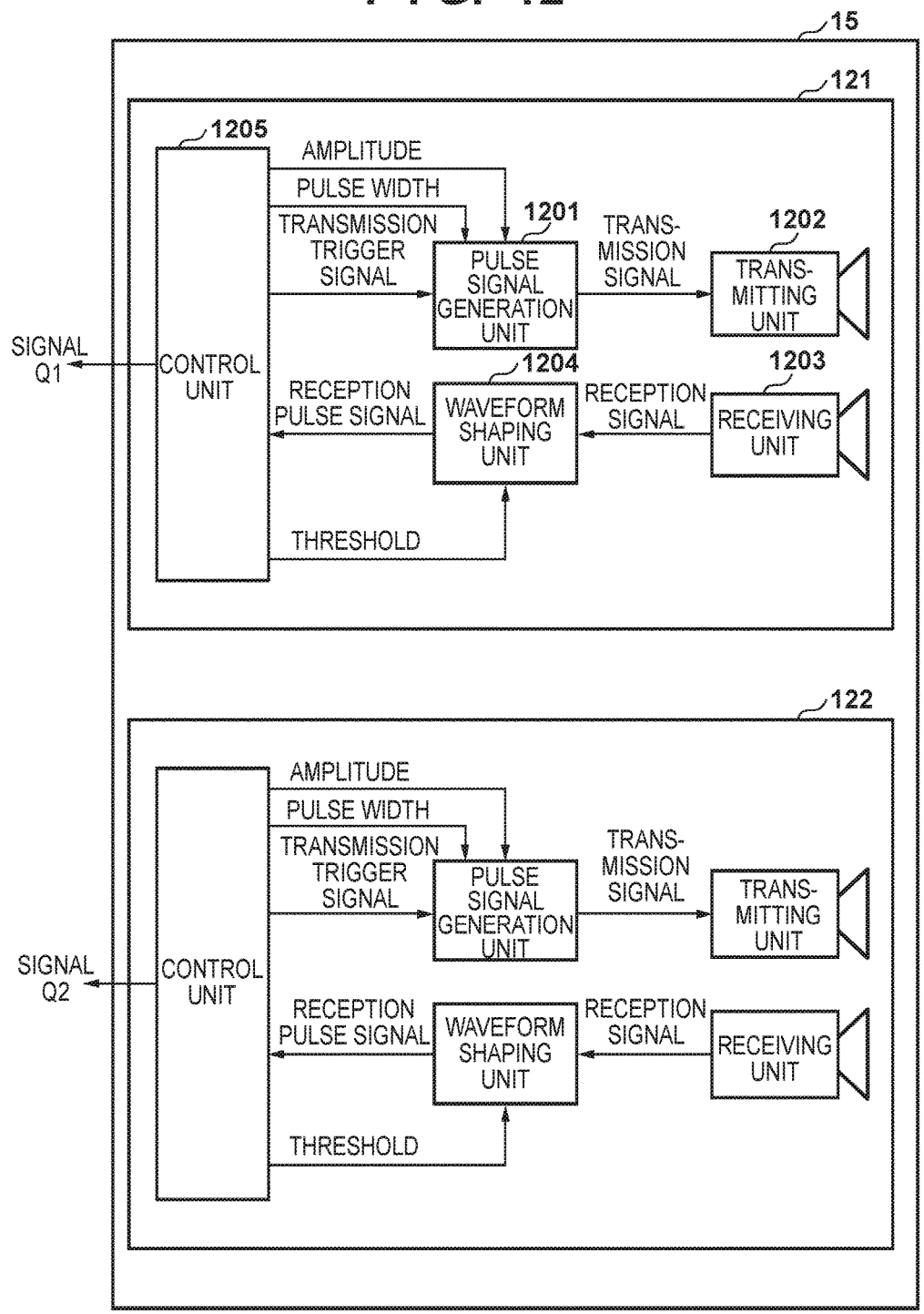

F I G. 17
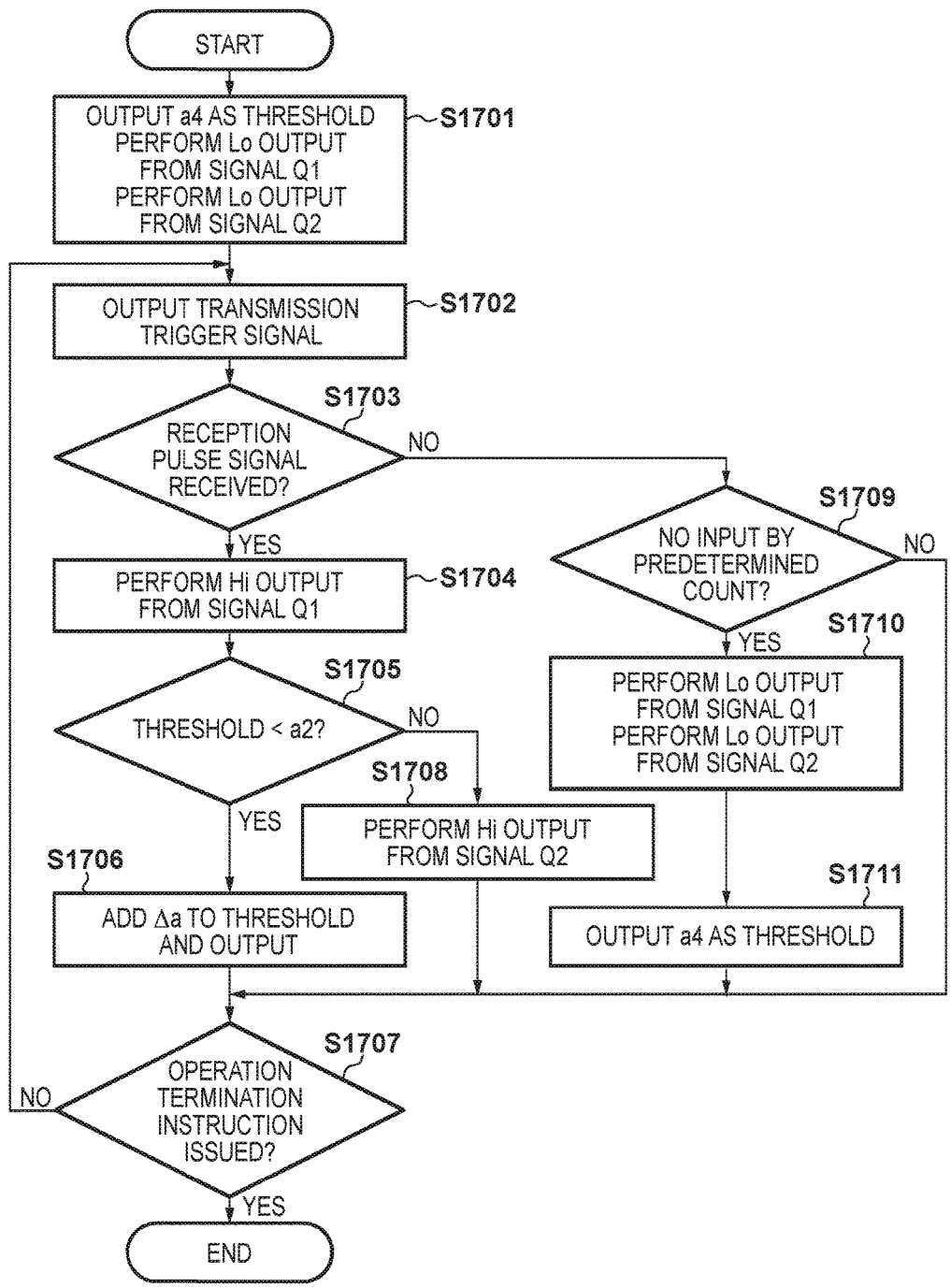

IMAGE FORMING APPARATUS AND CONTROL METHOD OF IMAGE FORMING APPARATUS

BACKGROUND OF THE INVENTION

Field of the Invention

The present invention relates to a power supply control technique using a sensor which detects an object.

Description of the Related Art

There is known a technique that an image forming apparatus recovers from a power saving state when a sensor provided in the image forming apparatus detects a person approaching the image forming apparatus (Japanese Patent Laid-Open No. 2012-203132). There is also known a technique of, when detecting the approaching person by using the sensor, operating in a different way between a case in which detection is performed at a position away from the image forming apparatus and a case in which detection is performed at a position close to the image forming apparatus.

More specifically, an operation of flashing a predetermined button or the display of an authentication device when the person at the position away from the image forming apparatus has been detected and an operation of recovering the image forming apparatus from a sleep state when the person at the position close to the image forming apparatus has been detected are performed.

At this time, the purpose of flashing the predetermined button or the display of the authentication device is to let the person know that he or she has been detected by the sensor and to lead a user of the image forming apparatus to a next operation (Japanese Patent Laid-Open No. 2011-112309). That is, in this case, the user of the image forming apparatus is prompted, by flashing the predetermined button or the display of the authentication device, to press the flashing button or perform personal authentication by the authentication device.

The sensor used in the above-described image forming apparatus is generally configured to receive a signal generated by detecting the person and determine that the person has been detected if the received signal exceeds a predetermined threshold. At this time, in order to detect the person at the position away from the image forming apparatus, it is better to detect the person even in a small input amount by lowering the threshold. On the other hand, in the case in which the person is detected at the position close to the image forming apparatus, it is better to raise the threshold so as not to recover the image forming apparatus from the sleep state upon reacting to the person passing in front of it and to recover the image forming apparatus from the sleep state when the sensor detects the person for a predetermined time. When performing the different operation for each region as described above, the necessity to control the threshold (sensitivity) of the sensor arises.

SUMMARY OF THE INVENTION

The present invention has been made in consideration of such a problem and provides a technique of performing power supply control of an image forming apparatus optimally in accordance with various distances to an object detected by a sensor.

According to the first aspect of the present invention, there is provided an image forming apparatus which includes an object detection sensor, the apparatus comprising: a notification unit configured to notify a user that the object detection sensor has detected an object when detection intensity by the object detection sensor is larger than a first threshold; and a control unit configured to recover the image forming apparatus to a state capable of executing a function of the image forming apparatus when detection intensity by the object detection sensor is larger than a second threshold which is larger than the first threshold.

According to the second aspect of the present invention, there is provided a control method of an image forming apparatus which includes an object detection sensor, the method comprising: notifying a user that the object detection sensor has detected an object when detection intensity by the object detection sensor is larger than a first threshold; and recovering the image forming apparatus to a state capable of executing a function of the image forming apparatus when detection intensity by the object detection sensor is larger than a second threshold which is larger than the first threshold.

According to the third aspect of the present invention, there is provided an image forming apparatus which includes an object detection sensor, the object detection sensor alone having both detection functions of a first detection function of detecting whether an object exists within a first distance from the object detection sensor and a second detection function of detecting whether the object exists within a second distance shorter than the first distance from the object detection sensor, the apparatus comprising: a control unit configured to control power supply to each device of the image forming apparatus in accordance with a result of a detection by the object detection sensor, and when the second detection function detects that the object exists within the second distance from the object detection sensor, to perform control so as to supply a power to not less than one device in addition to the device to which the power has been supplied in accordance with detection by the first detection function that the object exists within the first distance from the object detection sensor.

According to the fourth aspect of the present invention, there is provided a control method of an image forming apparatus which includes an object detection sensor, the object detection sensor alone having both detection functions of a first detection function of detecting whether an object exists within a first distance from the object detection sensor and a second detection function of detecting whether the object exists within a second distance shorter than the first distance from the object detection sensor, the method comprising: controlling power supply to each device of the image forming apparatus in accordance with a result of a detection by the object detection sensor, and when the second detection function detects that the object exists within the second distance from the object detection sensor, performing control so as to supply the power to not less than one device in addition to the device to which the power has been supplied in accordance with detection by the first detection function that the object exists within the first distance from the object detection sensor.

Further features of the present invention will become apparent from the following description of exemplary embodiments (with reference to the attached drawings).

BRIEF DESCRIPTION OF THE DRAWINGS

FIG. 1 is a view showing an example of the outer appearance of an image forming apparatus;

FIG. 7 is a diagram showing the power state of the image forming apparatus 100 in a silent recovery state ST3;

FIG. 8 is a diagram showing the power state of the image forming apparatus 100 in a display unit recovery state ST2;

FIG. 10 is a view showing the transition of power control in accordance with the distance between the image forming apparatus 100 and a user;

FIGS. 11A and 11B are flowcharts each showing a process of recovering from the state ST4 to the state ST1;

FIG. 12 is a diagram showing an example of the arrangement of an ultrasonic sensor 15;

FIG. 17 is a flowchart of a process performed by a control unit 1601.

DESCRIPTION OF THE EMBODIMENTS

Figure 2:
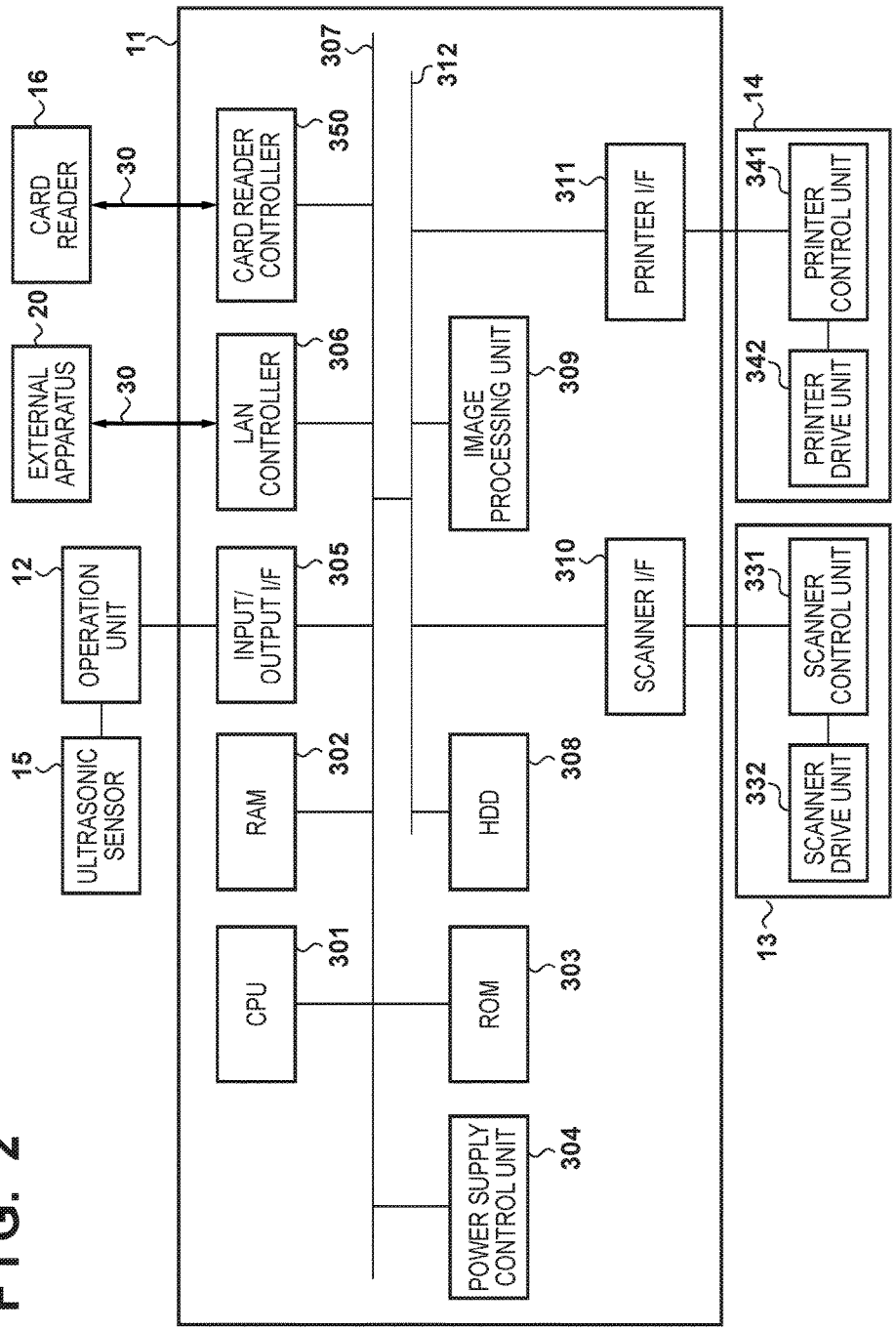
FIG. 2 is a block diagram showing an example of the hardware arrangement of an image forming apparatus 100.

Embodiments of the present invention will be described below with reference to the accompanying drawings. Note that the embodiments to be described below show an example when embodying the present invention concretely and is one concrete example of the arrangement described in the scope of claims.

[First Embodiment]

In this embodiment, an example of a technique of, in an image forming apparatus including an object detection sensor configured to detect the existence of an object, notifying a user that the object detection sensor has detected the object when detection intensity detected by the object detection sensor is larger than the first threshold and recovering the image forming apparatus to a state capable of executing a function of the image forming apparatus when detection intensity detected by the object detection sensor is larger than the second threshold which is larger than the first threshold.

In other words, such an image forming apparatus has an arrangement below. That is, in the image forming apparatus including the object detection sensor, the object detection sensor alone has both detection functions of the first detection function of detecting whether the object exists within the first distance from the object detection sensor and the second detection function of detecting whether the object exists within the second distance shorter than the first distance from the object detection sensor. The image forming apparatus controls power supply to each device of the image forming apparatus in accordance with a result of a detection by the object detection sensor. When the second detection function detects that the object exists within the second distance from the object detection sensor, the image forming apparatus performs control so as to supply the power to one or more devices in addition to the device to which the power has been supplied in accordance with detection by the first detection function that the object exists within the first distance from the object detection sensor.

First, an example of the outer appearance of the image forming apparatus according to this embodiment will be described with reference to FIG. 1. As shown in FIG. 1, an image forming apparatus 100 according to this embodiment is an MFP (Multi-Function Peripheral) having a plurality of functions such as a print function, a scanner function, a copy function, and a FAX function. The image forming apparatus 100 also includes, as the above-described object detection sensor, an ultrasonic sensor 15 configured to detect a person approaching the image forming apparatus 100.

The ultrasonic sensor 15 outputs a 40-KHz pulse wave in a non-audible range and receives the reflected wave of the pulse wave reflected by the object. Then, the ultrasonic sensor 15 measures the distance between the object and the image forming apparatus 100 (ultrasonic sensor 15) based on a time between outputting the pulse wave and receiving the reflected wave. In this embodiment, the ultrasonic sensor 15 is used as the object detection sensor. However, any sensor may be used as long as it can detect a person and, for example, an infrared receiving sensor which receives infrared rays emitted from the person may be used. Instead of the ultrasonic sensor 15, a capacitance sensor which measures the distance between the sensor and a target object based on a capacitance between the sensor and the target object may also be used. Instead of the ultrasonic sensor 15, an infrared array sensor in which infrared receiving units are arranged in a line or in a matrix may also be used.

As shown in FIG. 1, the ultrasonic sensor 15 has a fan-shaped detection area A1 and can detect a person when the person exists within the detection area A1. Note that this ultrasonic sensor 15 may be arranged so as to orient the output direction of the pulse wave upward in order to detect the person without being influenced by an obstacle such as a computer placed on a desk.

Next, an example of the hardware arrangement of the image forming apparatus 100 will be described with reference to a block diagram of FIG. 2. As shown in FIG. 2, the image forming apparatus 100 includes a controller unit 11, the ultrasonic sensor 15, an operation unit 12, a scanner unit 13, and a printer unit 14. Further, in FIG. 2, an external apparatus 20 and a card reader 16 are connected to the controller unit 11 via networks 30. The external apparatus 20 and the card reader 16 are external to the image forming apparatus 100 and are not essential constituent elements. However, the card reader 16 may be an internal apparatus of the image forming apparatus 100.

First, the controller unit 11 will be described. The controller unit 11 is configured to control the operation of the image forming apparatus 100.

A CPU 301 executes a process by using a computer program and data stored in a RAM 302 and a ROM 303. By doing so, the CPU 301 controls the overall operation of the image forming apparatus 100 and executes or controls each process to be described later as performed by the controller unit 11 (image forming apparatus 100). For example, the CPU 301 comprehensively controls access to various devices connected to the controller unit 11 and also comprehensively controls various processes executed by the controller unit 11.

The RAM 302 includes an area for storing the computer program and data loaded from an HDD 308 (Hard Disk Drive) and the ROM 303, and an image output from the scanner unit 13 via a scanner I/F 310. The RAM 302 also includes an area for storing data output from an input/output I/F 305, a LAN controller 306, and a card reader controller 350. The RAM 302 further includes a work area to be used when the CPU 301 executes various processes. As described above, the RAM 302 can provide various areas as needed.

The ROM 303 stores a boot program of the image forming apparatus 100, data which need not be changed, and the like.

A power supply control unit 304 controls power supply to each unit of the image forming apparatus 100. Details of the power supply control unit 304 will be described later.

The input/output I/F 305 is an interface unit configured to connect a system bus 307 and the operation unit 12. The input/output I/F 305 receives data of a screen to be displayed for the operation unit 12 from the system bus 307 to output it to the operation unit 12 and outputs information input from the operation unit 12 to the system bus 307.

The LAN controller 306 is configured to perform data communication with the external apparatus 20 via the network 30.

The card reader controller 350 controls the card reader 16 via the network 30 and outputs user information input from the card reader 16 to the system bus 307.

The HDD 308 is an example of a mass information storage device. The HDD 308 saves an OS (Operating System) and a computer program, data, and the like for causing the CPU 301 to execute each process to be described later as performed by the CPU 301. Note that some or all of the areas described above as provided in the RAM 302 may be provided in the HDD 308. The computer program and data saved in the HDD 308 are loaded into the RAM 302 as needed in accordance with control by the CPU 301, and become targets to be processed by the CPU 301.

An image processing unit 309 is configured to perform image processing. The image processing unit 309 reads out images (such as an image read by the scanner unit 13 and a target image to be printed by the printer unit 14) stored in the RAM 302 and performs image processing of, for example, enlargement or reduction such as JPEG and JBIG, and color adjustment.

The scanner I/F 310 is an interface unit configured to communicate with a scanner control unit 331 of the scanner unit 13.

A printer I/F 311 is an interface unit configured to communicate with a printer control unit 341 of the printer unit 14.

All of the HDD 308, the image processing unit 309, the scanner I/F 310, and the printer I/F 311 are connected to an image bus 312. The image bus 312 is a transmission path for exchanging the images and formed by a bus such as a PCI bus or IEEE1394.

Next, the scanner unit 13 will be described. The scanner unit 13 is a device which optically reads, as an image, information recorded on a recording medium such as paper and outputs the read image.

A scanner drive unit 332 includes a drive unit configured to move a read head which reads the recording medium, a drive unit configured to convey the recording medium to a reading position, and the like.

The scanner control unit 331 is configured to control the operation of the scanner drive unit 332. The scanner control unit 331 receives, by communication with the CPU 301, setting information set by a user when performing a reading operation (scanner process) on the recording medium and controls the operation of the scanner drive unit 332 based on the setting information.

Next, the printer unit 14 will be described. The printer unit 14 is a device which prints an image and characters on the recording medium such as paper based on print data, and forms the image and the characters on the printing medium in accordance with, for example, electrophotography.

A printer drive unit 342 includes a motor which rotates a photosensitive drum (not shown) of the printer unit 14, a mechanism unit configured to compress a fixing device, a heater, and the like.

The printer control unit 341 is configured to control the operation of the printer drive unit 342. The printer control unit 341 receives, by communication with the CPU 301, setting information set by the user when performing an image and character forming operation (print process) on the recording medium, and controls the operation of the printer drive unit 342 based on the setting information.

Figure 3:
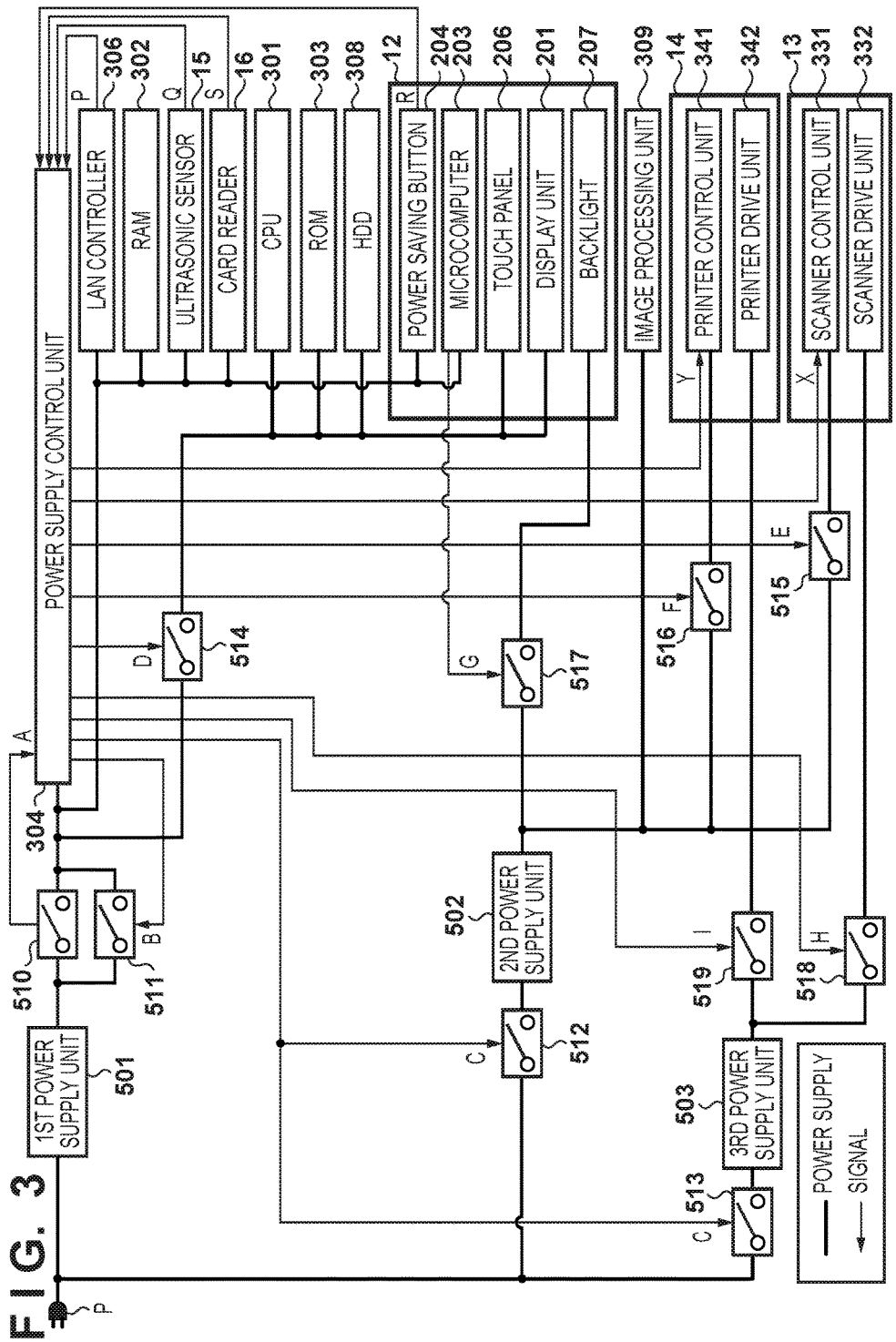
FIG. 3 is a diagram showing an arrangement for supplying a power to each functional unit of the image forming apparatus 100.

The arrangement for supplying the power to each functional unit of the image forming apparatus 100 will now be described with reference to a block diagram of FIG. 3. FIG. 3 shows the more detailed arrangement of the operation unit 12. However, the detailed arrangement of the operation unit 12 will be described later.

The image forming apparatus 100 includes a first power supply unit 501, a second power supply unit 502, and a third power supply unit 503 in order to supply the power to each functional unit of the image forming apparatus 100.

First, the first power supply unit 501 will be described. The first power supply unit 501 generates a direct-current power supply of about 5.0 V from an alternating-current power supply supplied via a plug P. Then, the first power supply unit 501 supplies the generated direct-current power supply to the LAN controller 306, the RAM 302, the ultrasonic sensor 15, the card reader 16, the CPU 301, the ROM 303, the HDD 308, and the operation unit 12 (except for a backlight 207). That is, in the operation unit 12, the direct-current power supply is supplied to a power saving button 204, a microcomputer 203, a touch panel 206, and a display unit 201. These functional units which receive a power supply from the first power supply unit 501 will be referred to as the first power supply system device hereinafter.

Next, the second power supply unit 502 will be described. The second power supply unit 502 generates the direct-current power supply of about 12.0 V from the alternating-current power supply supplied via the plug P. Then, the second power supply unit 502 supplies the generated direct-current power supply to the backlight 207, the image processing unit 309, the printer control unit 341, and the scanner control unit 331. These functional units which receive a power supply from the second power supply unit 502 will be referred to as the second power supply system device hereinafter.

Then, the third power supply unit 503 will be described. The third power supply unit 503 generates the direct-current power supply of about 24.0 V from the alternating-current power supply supplied via the plug P. Then, the third power supply unit 503 supplies the generated direct-current power supply to the printer drive unit 342 and the scanner drive unit 332. These functional units which receive a power supply from the third power supply unit 503 will be referred to as the third power supply system device hereinafter.

A seesaw switch 510 set in an ON state or an OFF state in accordance with a user operation is arranged between the first power supply unit 501 and the first power supply system device. In addition, a relay switch 511 for supplying the direct-current power supply generated by the first power supply unit 501 to the first power supply system device is arranged, in parallel to the seesaw switch 510, between the first power supply unit 501 and the first power supply system device. Even if the seesaw switch 510 is set in the OFF state by the user operation, the direct-current power supply is supplied from the first power supply unit 501 to the first power supply system device via the relay switch 511 as long as the relay switch 511 is in the ON state. The seesaw switch 510 notifies the power supply control unit 304 of a signal A indicating whether the seesaw switch 510 is in the ON state or the OFF state. If the signal A notified from the seesaw switch 510 indicates the OFF state, the power supply control unit 304 instructs the CPU 301 to execute a shutdown process. Then, when the CPU 301 executes the shutdown process in accordance with the instruction, the power supply control unit 304 sets, in addition to the relay switch 511, relay switches 512 and 513 in the OFF state. This sets the image forming apparatus 100 in the OFF state.

The relay switch 512 for switching between the supply and cutoff of the alternating-current power supply from the plug P to the second power supply unit 502 is arranged between the plug P and the second power supply unit 502. The relay switch 513 for switching between the supply and cutoff of the alternating-current power supply from the plug P to the third power supply unit 503 is arranged between the plug P and the third power supply unit 503.

A switch 514 for switching between the supply and the stop of the direct-current power supply to the respective functional units of the CPU 301, the ROM 303, the HDD 308, the touch panel 206, and the display unit 201 is arranged between the respective functional units and the first power supply unit 501.

A switch 515 for switching between the supply and the stop of the direct-current power supply to the scanner control unit 331 is arranged between the scanner control unit 331 and the second power supply unit 502.

A switch 516 for switching between the supply and the stop of the direct-current power supply to the printer control unit 341 is arranged between the printer control unit 341 and the second power supply unit 502.

A switch 517 for switching the supply and the stop of the direct-current power supply to the backlight 207 which turns on the display unit 201 of the operation unit 12 so that a screen display becomes visible is arranged between the backlight 207 and the second power supply unit 502.

A switch 518 for switching between the supply and the stop of the direct-current power supply to the scanner drive unit 332 is arranged between the scanner drive unit 332 and the third power supply unit 503.

A switch 519 for switching between the supply and the stop of the direct-current power supply to the printer drive unit 342 is arranged between the printer drive unit 342 and the third power supply unit 503.

The power supply control unit 304 will now be described. The power supply control unit 304 is a logic circuit which can be rewritten by the computer program. The power supply control unit 304 of this embodiment is a CPLD (Complex Programmable Logic Device).

The power supply control unit 304 detects a recovery factor for recovering the image forming apparatus 100 from a power saving state ST4. Then, the power supply control unit 304 performs power control in accordance with the detected recovery factor. The recovery factor detected by the power supply control unit 304 includes factors below.

The seesaw switch 510 changes from the OFF state to the ON state.

A specific packet (for example, a print job) is received from the external apparatus 20.

The ultrasonic sensor 15 detects the person.

The user presses the power saving button 204.

User authentication is performed in the card reader 16.

The power supply control unit 304 receives the signal A and signals P, Q, R, and S indicating the above-described recovery factors. As described above, the signal A indicates the state (ON state/OFF state) of the seesaw switch 510. The signal P indicates that the LAN controller 306 has received the specific packet (such as the print job) from the external apparatus 20. The signal Q indicates that the ultrasonic sensor 15 has detected the object such as the person. The signal R indicates that the user has presses the power saving button 204 of the operation unit 12. The signal S indicates that a user authentication operation has been performed upon presenting a card to the card reader 16. Of course, the recovery factors are not limited to the factors listed above but may include another factor.

The power supply control unit 304 outputs signals B, C, D, E, F, H, and I (controls logic of the signals B, C, D, E, F, H, and I). The signal B is a signal for switching the relay switch 511 to the ON state or the OFF state. The signal C is a signal for switching the relay switches 512 and 513 to the ON state or the OFF state. The signal D is a signal for switching the switch 514 to the ON state or the OFF state. The signal E is a signal for switching the switch 515 to the ON state or the OFF state. The signal F is a signal for switching the switch 516 to the ON state or the OFF state. The signal H is a signal for switching the switch 518 to the ON state or the OFF state. The signal I is a signal for switching the switch 519 to the ON state or the OFF state.

When the seesaw switch 510 is set in the OFF state by the user operation, logic of the signal A changes to Low level. When logic of the signal A changes to Low level, the power supply control unit 304 instructs the CPU 301 to shut down the image forming apparatus 100. The CPU 301 executes the shutdown process in accordance with the instruction. The power supply control unit 304 controls the signal B and the signal C to set the relay switches 511, 512, and 513 in the OFF state. This allows the image forming apparatus 100 to be set in the OFF state appropriately after the shutdown process.

When the LAN controller 306 receives the specific packet (print job) from the external apparatus 20, logic of the signal P changes to Hi level. When logic of the signal P changes to Hi level, the power supply control unit 304 controls the signal C, the signal D, the signal F, and the signal I to set the relay switches 512, 513, 514, 516, and 519 in the ON state. This can cause the printer unit 14 to perform printing based on the print job.

The ultrasonic sensor 15 outputs the signal Q made of two signals of a signal Q1 indicating whether the ultrasonic sensor 15 has detected the object in a detectable region (A1 in FIG. 1) and a signal Q2 indicating whether the detected object exists in a predetermined region (a short distance region of the image forming apparatus 100 in this embodiment).

When the ultrasonic sensor 15 has detected the object in the detectable region, logic of the signal Q1 changes to Hi level. When logic of the signal Q1 changes to Hi level, the power supply control unit 304 controls the signals C, D, E, F, H, and I to set the switches 512 to 516, 518, and 519 in the ON state. At this time, the microcomputer 203 outputs a signal G with its logic being at Low level. The signal G is a signal for switching the switch 517 to the ON state or the OFF state. When logic of the signal G is at Low level, the signal G will be a signal for switching the switch 517 to the OFF state. Therefore, when the ultrasonic sensor 15 has detected the object in the detectable region, recovery from the power saving state ST4 is performed without energizing the backlight 207.

When logic of the signal Q1 changes to Hi level, the power supply control unit 304 changes logic of signals Y and X to Hi level.

The signal X is a signal for switching between whether the scanner control unit 331 performs activation with driving the scanner drive unit 332 and whether the scanner control unit 331 performs activation without driving the scanner drive unit 332. If logic of the signal X is at Hi level when the direct-current power supply is supplied to the scanner control unit 331, the scanner control unit 331 activates the scanner unit 13 while stopping driving the scanner drive unit 332 (to be referred to as silent activation of the scanner unit 13 hereinafter). If logic of the signal X is at Low level when power is supplied to the scanner control unit 331, the scanner control unit 331 drives the scanner drive unit 332 to activate the scanner unit 13.

The signal Y is a signal for switching between whether the printer control unit 341 performs activation with driving the printer drive unit 342 and whether the printer control unit 341 performs activation without driving the printer drive unit 342. If logic of the signal Y is at Hi level when the direct-current power supply is supplied to the printer control unit 341, the printer control unit 341 activates the printer unit 14 while stopping driving the printer drive unit 342 (to be referred to as silent activation of the printer unit 14 hereinafter). If logic of the signal Y is at Low level when the direct-current power supply is supplied to the printer control unit 341, the printer control unit 341 drives the printer drive unit 342 to activate the printer unit 14.

Therefore, when the ultrasonic sensor 15 has detected the object in the detectable region, not only recovery from the power saving state ST4 is performed without energizing the backlight 207 but also silent activation of the printer unit 14 and the scanner unit 13 is performed at this time.

When the ultrasonic sensor 15 has detected the object at a short distance from the image forming apparatus 100, logic of the signal Q2 changes to Hi level. When logic of the signal Q2 changes to Hi level, the power supply control unit 304 notifies the microcomputer 203 of this. Since the microcomputer 203 outputs the signal G with its logic being at Hi level, the backlight 207 is energized and turned on.

When the user presses the power saving button 204, logic of the signal R changes to Hi level. When logic of the signal R changes to Hi level, the power supply control unit 304 controls the signals C, D, E, F, H, and I to set the relay switches 512 to 516, 518, and 519 in the ON state. Since the microcomputer 203 outputs the signal G with its logic being at Hi level, the backlight 207 is energized and turned on. When the power saving button 204 is pressed, the power supply control unit 304 changes logic of the signals Y and X to Hi level.

When user authentication is requested in the card reader 16, logic of the signal S changes to Hi level. When logic of the signal S changes to Hi level, the power supply control unit 304 controls the signals C, D, E, F, H, and I to set the relay switches 512 to 516, 518, and 519 in the ON state. Since the microcomputer 203 outputs the signal G with its logic being at Hi level, the backlight 207 is energized and turned on. When user authentication is requested in the card reader 16, the power supply control unit 304 changes logic of the signals Y and X to Hi level.

Note that each of the switches 511 to 519 described above may be an FET.

Figure 4:
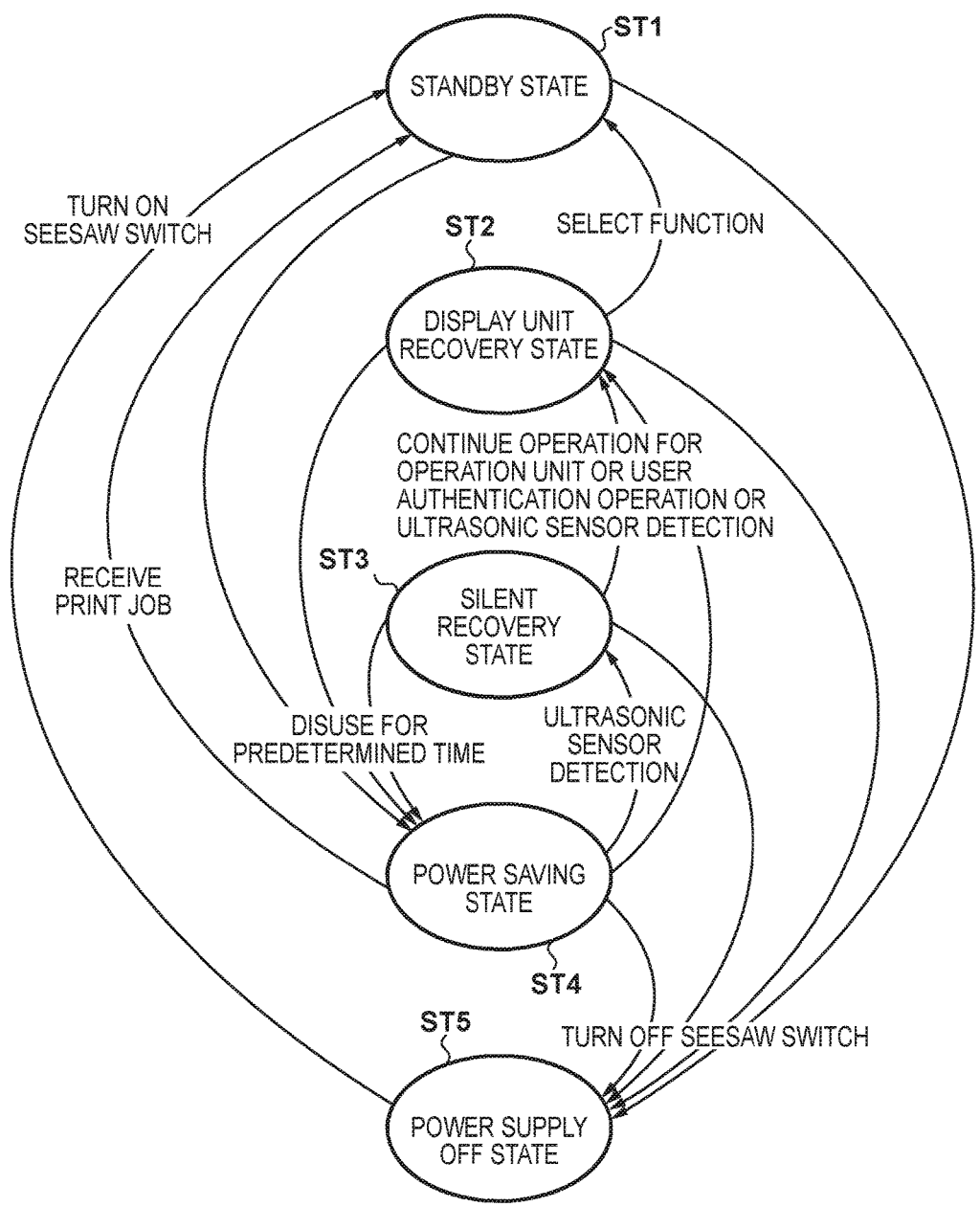
FIG. 4 is a transition view showing a power supply state of the image forming apparatus 100.

A power supply state transition in the image forming apparatus 100 will now be described with reference to FIG. 4 showing a transition view of a power supply state of the image forming apparatus 100. The image forming apparatus 100 is in any of a standby state ST1, a display unit recovery state ST2, a silent recovery state ST3, the power saving state ST4, and a power supply OFF state ST5. The state changes in accordance with various conditions, as will be described below in detail.

In the standby state ST1, all functions of the image forming apparatus 100 are in an operational state (normal operation state) in which an image reading operation by the scanner unit 13 and a print operation by the printer unit 14 can be performed. When the operation unit 12 is not performed for a predetermined time and a job is not received from the external apparatus 20 in the standby state ST1, the image forming apparatus 100 shifts from the standby state ST1 to the power saving state ST4.

In the power saving state ST4, power consumption is lower than in the standby state ST1. In the power saving state ST4, power is supplied to only the devices (such as the ultrasonic sensor 15, the card reader 16, and the LAN controller 306) needed to recover from the power saving state ST4. When the ultrasonic sensor 15 detects the person in the power saving state ST4, the image forming apparatus 100 shifts to the silent recovery state ST3.

In the silent recovery state ST3, power is supplied to, in addition to the devices to which power has been supplied in the power saving state ST4, the CPU 301, the ROM 303, the HDD 308, the touch panel 206, the display unit 201, the image processing unit 309, the scanner unit 13, and the printer unit 14 of the controller unit 11. When the image forming apparatus 100 shifts from the power saving state ST4 to the silent recovery state ST3, the above-described silent activation is performed. Therefore, in the silent recovery state ST3, the printer control unit 341 and the scanner control unit 331, respectively, do not drive the printer drive unit 342 and the scanner drive unit 332. Upon activation of the respective functional units caused by the shift from the power saving state ST4 to the silent recovery state ST3, the CPU 301, the image processing unit (ASIC) 309, the CPU of the scanner control unit 331, and the CPU of the printer control unit 341 perform initialization.

When the print job for causing the printer unit 14 to perform printing is received from the external apparatus 20 in the power saving state ST4, the image forming apparatus 100 shifts to the standby state ST1.

On the other hand, if a condition that the user performs an operation on the operation unit 12, user authentication by the card reader 16 is performed, the ultrasonic sensor 15 continues detection at the short distance, or the like is satisfied in the power saving state ST4, the image forming apparatus 100 shifts to the display unit recovery state ST2.

In this embodiment, however, the ultrasonic sensor 15 is to detect the user before the power saving button 204 is pressed. Therefore, the power saving button 204 is not to be pressed in the power saving state ST4. Similarly, in the power saving state ST4, the ultrasonic sensor 15 is to detect the user before performing the user authentication operation (an insertion of the card into the card reader or contact of the card with the card reader) by the card reader 16. Therefore, in the power saving state ST4, the user authentication operation by the card reader is not to be performed.

In the silent recovery state ST3, the power saving button 204 and a light source (not shown) in the card reader 16 are flashed. This can prompt the user to a portion that should be operated to shift from the silent recovery state ST3 to the display unit recovery state ST2.

When the user operation is performed on the operation unit 12, the user authentication operation is performed in the card reader 16, or the ultrasonic sensor 15 continues to detect the person at the short distance in the silent recovery state ST3, the image forming apparatus 100 shifts to the display unit recovery state ST2.

When the image forming apparatus 100 shifts to the display unit recovery state ST2, the backlight 207 is turned on and some type of screen (for example, a main menu screen to be described later) is displayed in the display unit 201. The user can select the function of the image forming apparatus 100 through the main menu screen (for example, a main menu screen 201a as shown in FIG. 9B) displayed in the display unit 201. When the image forming apparatus 100 shifts to the display unit recovery state ST2, flashing of the power saving button 204, flashing of the light source (not shown) in the card reader 16, and generation of a sound are stopped. At this time, the image forming apparatus 100 is in an operation state, and thus the power saving button 204 and the light source of the card reader 16 are generally in an ON state.

When the function of the image forming apparatus 100 is selected through the main menu screen 201a displayed in this display unit recovery state ST2, the image forming apparatus 100 shifts to the standby state ST1 capable of executing the selected function. For example, when the print function is selected through the main menu screen 201a, the printer control unit 341 cancels a restriction on driving of the printer drive unit 342 and drives the printer drive unit 342. When the scanner function is selected through the main menu screen 201a, the scanner control unit 331 cancels a restriction on driving of the scanner drive unit 332 and drives the scanner drive unit 332. As described above, when the seesaw switch 510 is operated from the ON state to the OFF state by the user operation, the image forming apparatus 100 shifts to the power supply OFF state ST5.

Power supply states in the respective functional units of the image forming apparatus 100 in the respective states shown in FIG. 4 will now be described with reference to FIGS. 5 to 8. Note that in FIGS. 5 to 8, each functional unit filled in gray indicates a functional unit to which power is not supplied and each functional unit not filled in gray indicates a functional unit to which power is supplied.

Figure 5:
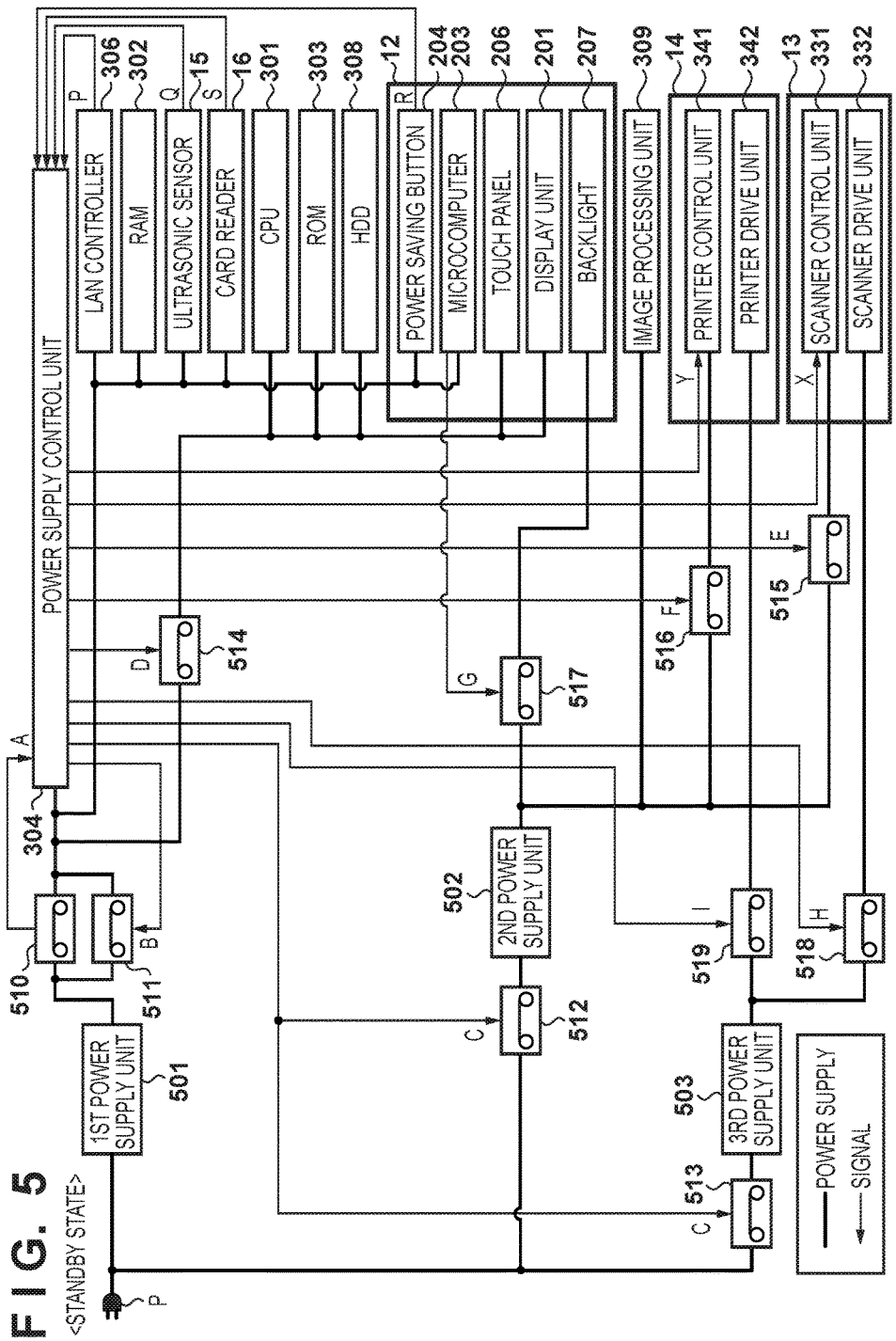
FIG. 5 is a diagram showing a power state of the image forming apparatus 100 in a standby state ST1.

In the standby state ST1, the respective switches 510 to 519 of the image forming apparatus 100 are in the ON state, as shown in FIG. 5. Therefore, power is supplied to each functional unit of the image forming apparatus 100.

Figure 6:
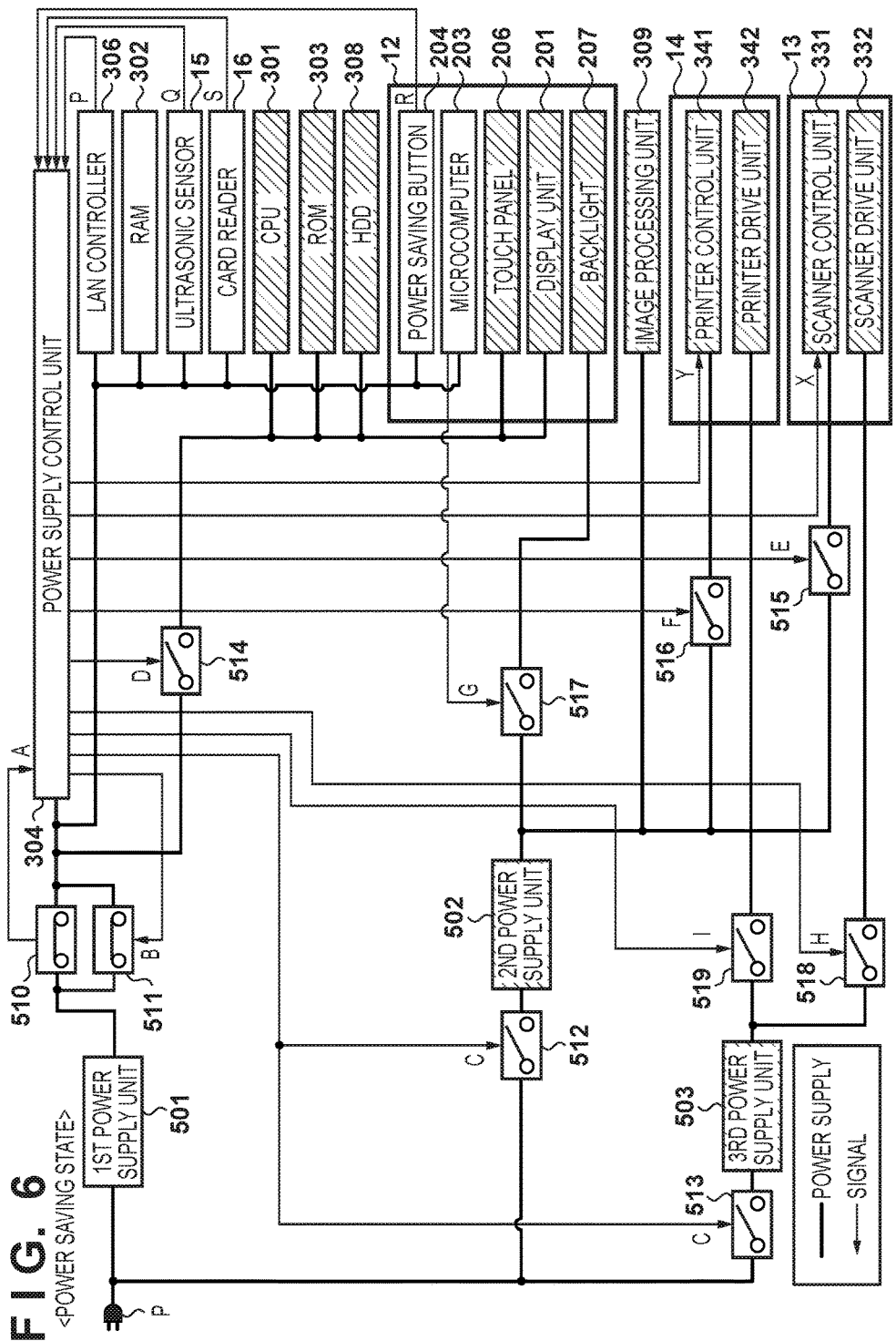
FIG. 6 is a diagram showing the power state of the image forming apparatus 100 in a power saving state ST4.

In the power saving state ST4, power is supplied to only some devices in the first power supply system and power is not supplied to the functional units other than these, as shown in FIG. 6. In the power saving state ST4, while the relay switch 511 for supplying power generated by the first power supply unit 501 is set in the ON state, the other switches 512 to 519 are set in the OFF state. As a result, in the power saving state ST4, power is supplied to the power supply control unit 304, the RAM 302, the LAN controller 306, the ultrasonic sensor 15, the card reader 16, the power saving button 204, and the microcomputer 203. Note that power may be supplied to the microcomputer 203 when the ultrasonic sensor 15 detects the person or user authentication is performed by the card reader.

In the silent recovery state ST3, power is supplied to, in addition to the functional units to which power is supplied in the power saving state ST4, the display unit 201, the touch panel 206, the CPU 301, the HDD 308, the ROM 303, the image processing unit 309, the printer unit 14, and the scanner unit 13, as shown in FIG. 7. Note that although power is supplied to the printer drive unit 342 and the scanner drive unit 332, the printer control unit 341 and the scanner control unit 331, respectively, restrict driving of the printer drive unit 342 and the scanner drive unit 332.

In the display unit recovery state ST2, power is supplied to the backlight 207 in addition to the functional units to which power is supplied in the silent recovery state ST3, as shown in FIG. 8. This allows the user to recognize that the display unit 201 displays various types of information. Also in the display unit recovery state ST2, however, the printer control unit 341 and the scanner control unit 331, respectively, restrict driving of the printer drive unit 342 and the scanner drive unit 332, while power is supplied to the printer drive unit 342 and the scanner drive unit 332.

The operation unit 12 will now be described with reference to FIGS. 9A to 9C. The display unit 201 is configured to display various images. The display screen of the display unit 201 is formed integrally with the touch panel 206. Therefore, when the user touches on the display screen of the display unit 201, the touch panel 206 can detect that touch position. The CPU 301 is notified of the touch position detected by the touch panel 206, and executes a process in accordance with the notified touch position.

The microcomputer 203 comprehensively controls the operation unit 12 and displays, on the display screen of the display unit 201, the main menu screen 201a (FIG. 9B) for selecting the copy function, the print function, the scan function, or the like. The microcomputer 203 also displays, on the display screen of the display unit 201, a setting screen 201b (FIG. 9C) for executing the function selected in the main menu screen 201a. The microcomputer 203 controls the above-described signal G to turn on the backlight 207 so that the user can see the image displayed in the display unit 201.

Figure 9A:
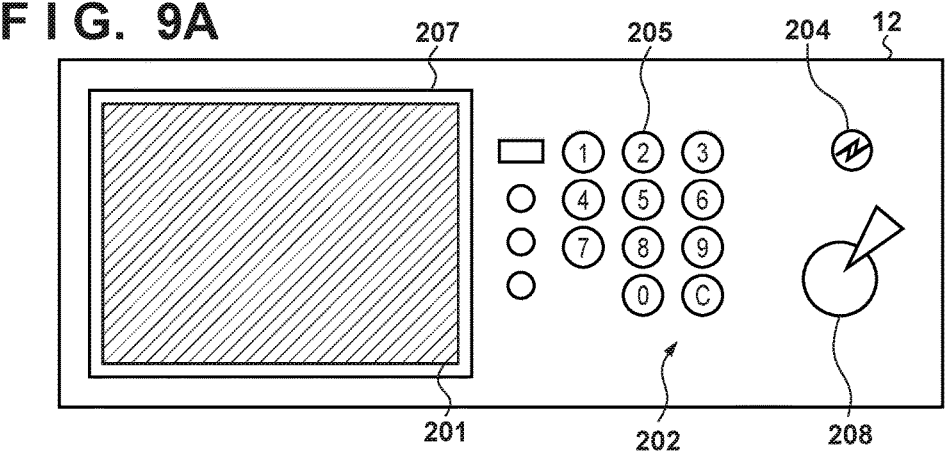
FIGS. 9A to 9C are views for explaining an operation unit 12.
Figure 9B:
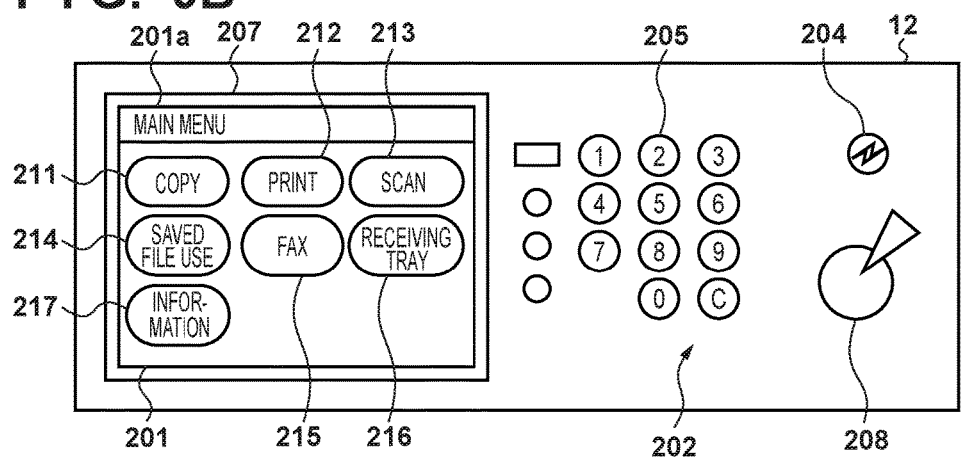

As shown in FIG. 9A, in the power supply OFF state ST5, the power saving state ST4, and the silent recovery state ST3, a state in which images nor characters are displayed on the display screen of the display unit 201, or a so-called non-display state is set. In this non-display state, the backlight 207 may be set in the OFF state while the images and the characters are displayed on the display screen of the display unit 201 or the images and the characters may not be displayed on the display screen of the display unit 201 in the first place. In contrast, a state in which the images and the characters are displayed on the display screen of the display unit 201 as shown in each of FIGS. 9B and 9C is referred to as a display state.

Note that as shown in FIG. 9B, the main menu screen 201a includes a copy icon 211 for executing the copy function, a print icon 212 for executing the print function, and a scan icon 213 for executing the scanner function. The main menu screen 201a also includes a saved file use icon 214 for using a file saved in the HDD 308 and a FAX icon 215 for executing the FAX function. The main menu screen 201a further includes a receiving tray icon 216 for checking received mail and an information icon 217 for displaying the various types of information.

Figure 9C:
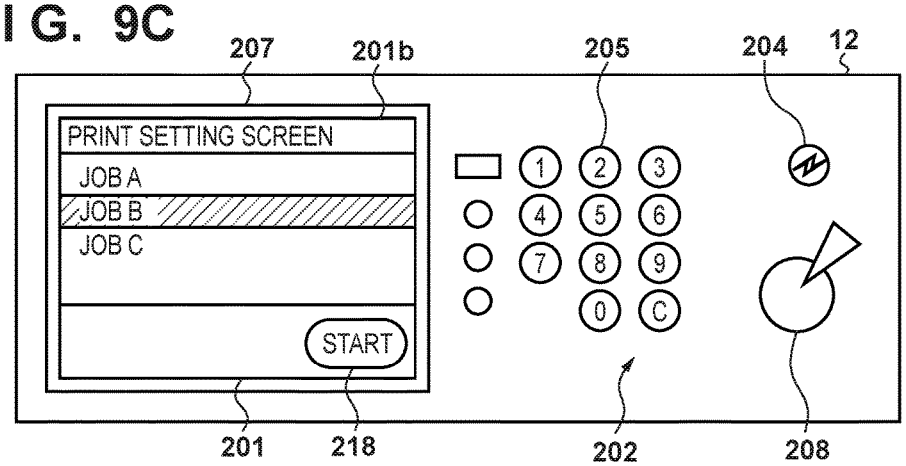

As shown in FIG. 9C, the setting screen 201b includes a start button 218 for issuing an execution instruction of a selected job ("JOB B" is selected in FIG. 9C).

Buttons 202 include a start key 208 for issuing an execution instruction to start copying or scanning. The buttons 202 also include the power saving button 204. If the user presses the power saving button 204 when the image forming apparatus 100 is in the standby state ST1, the image forming apparatus 100 can shift to the power saving state ST4. If the user presses the power saving button 204 when the image forming apparatus 100 is in the power saving state ST4, the image forming apparatus 100 can shift to the standby state ST1. The buttons 202 further include a ten-key pad 205 for inputting the number of copies or the like.

The transition of power control in accordance with the distance between the image forming apparatus 100 and the user will now be described with reference to FIG. 10. Referring to FIG. 10, the upper stage shows the positional relationship (distance) between the image forming apparatus 100 and the user, and the lower stage shows the power state of the image forming apparatus 100 corresponding to the positional relationship shown at the upper stage.

In a state T1 in which the user exists outside the detection area A1 of the ultrasonic sensor 15 when the image forming apparatus 100 is in the power saving state ST4, the image forming apparatus 100 waits in the power saving state ST4. In the power saving state ST4, power is supplied to only the limited devices such as the ultrasonic sensor 15. More specifically, in the power saving state ST4, power is supplied to the LAN controller 306, the RAM 302, the ultrasonic sensor 15, the card reader 16, the microcomputer 203, and the power saving button 204, as shown at the lower stage.

Then, in a state T2 in which the user enters into the detection area A1 of the ultrasonic sensor 15, the ultrasonic sensor 15 detects the user. As a result, power is supplied to the controller unit 11 and the like. More specifically, in the state T2, power is supplied to, in addition to the devices to which power is supplied in the power saving state ST4, the display unit 201, the touch panel 206, the scanner unit 13, the printer unit 14, the image processing unit 309, the HDD 308, the ROM 303, and the CPU 301. This starts activating the controller unit 11, the scanner unit 13, and the printer unit 14. However, the scanner control unit 331 restricts driving of the scanner drive unit 332 and the printer control unit 341 restricts driving of the printer drive unit 342. Therefore, even if activation starts, it is started without the driving sound of the printer drive unit 342.

Note that in this embodiment, since it is uncertain whether the user intends to use the image forming apparatus 100 in the state T2, power is not supplied to the backlight 207. Also in the state T2, the power saving button 204 and the card reader 16 are flashed to prompt the user who intends to use the image forming apparatus 100 to a portion that should be operated next.

In a state T3 in which the user approaching the image forming apparatus 100 presses the power saving button 204, performs user authentication by the card reader 16, or operates the touch panel 206 or the like, power is supplied to the backlight 207 to turn on the screen display of the display unit 201.

The user presses the power saving button 204 or the touch panel 206, or performs user authentication by the card reader 16 with intent to use the image forming apparatus 100. Therefore, power is supplied to the backlight 207 at timing when the power saving button 204 or the touch panel 206 is pressed, or user authentication is performed by the card reader 16.

When the backlight 207 is turned on, flashing of the power saving button 204 and the card reader 16 is stopped (in this embodiment, the ON state is set in order to indicate that the image forming apparatus 100 is in the operation state). Then, the display unit 201 displays the main menu screen 201a for selecting the functions (copy, print, scan, box, FAX, and the like) of the image forming apparatus 100.

When the user selects the function in the main menu screen 201a, this corresponds to a state T4. In this case, power is supplied to a portion needed to execute the function. When the print icon 212 displayed on the main menu screen 201a is selected, the printer control unit 341 cancels the restriction on driving of the printer drive unit 342 and sets the printer drive unit 342 in a drivable state.

Figure 11A:
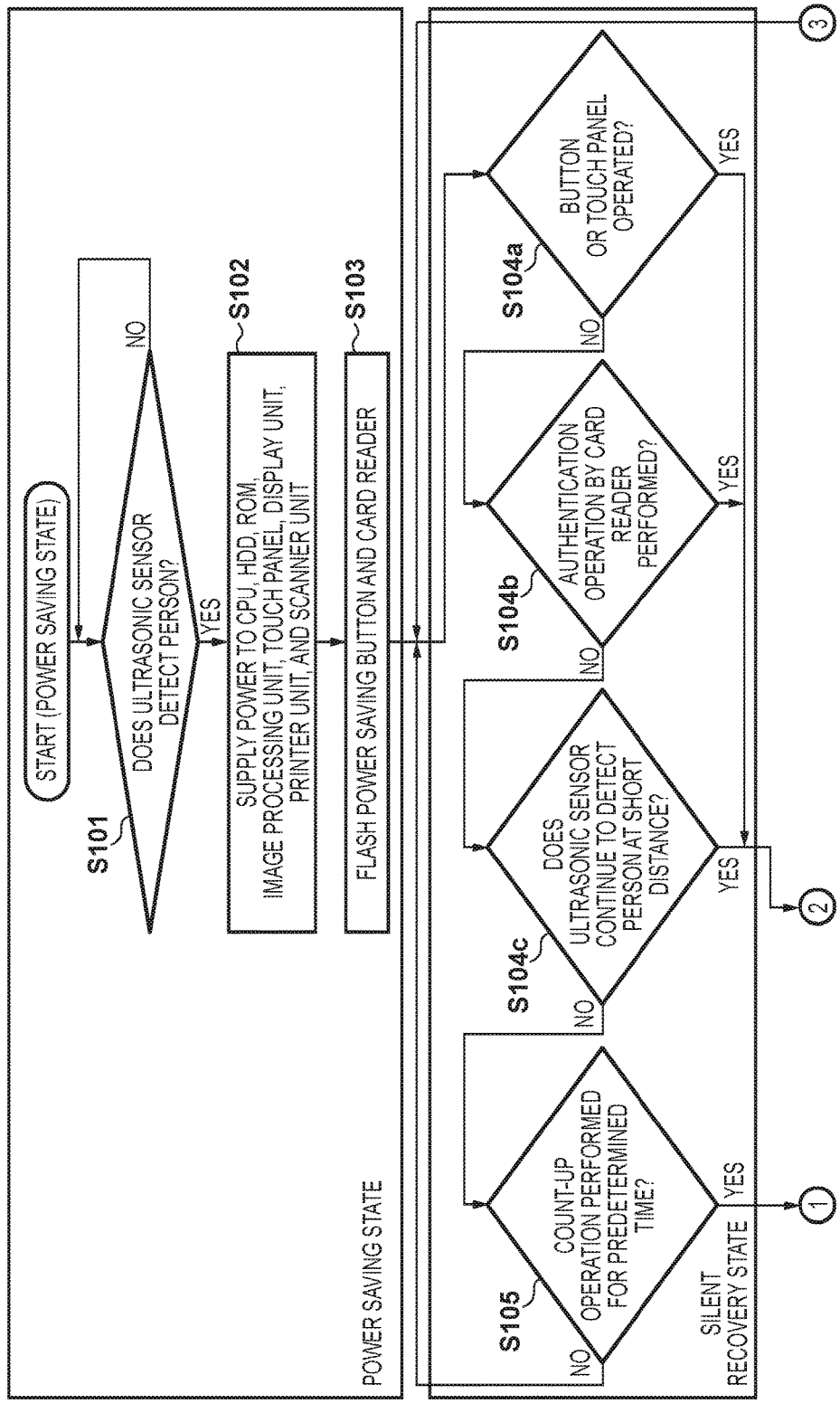

A series of operations in which the image forming apparatus 100 recovers from the power saving state ST4 to the standby state ST1 will now be described with reference to FIGS. 11A and 11B each showing a flowchart of the same process. Therefore, at the start of the process according to the flowchart of FIGS. 11A and 11B, the image forming apparatus 100 is in the power saving state ST4.

A subject of the process in each following step is not limited to a subject to be described below. Another functional unit may be the subject depending on the step.

<Step S101>

The power supply control unit 304 refers to the signal Q (including the signals Q1 and Q2) from the ultrasonic sensor 15. When the signal Q1 changes to Hi level, that is, the person exists in the detection area A1, the process advances to step S102. When the signal Q1 is at Low level, the process waits in step S101.

<Step S102>

When logic of the signal Q1 changes to Hi level, the power supply control unit 304 controls the signals C, D, E, F, H, and I to set the switches 512 to 516, 518, and 519 in the ON state. As a result, power is supplied to the CPU 301, the HDD 308, the ROM 303, the touch panel 206, the display unit 201, the image processing unit 309, the printer unit 14, and the scanner unit 13. Since the microcomputer 203 outputs the signal G with its logic being at Low level, the switch 517 is set in the OFF state and the backlight 207 is not energized, making the screen OFF in the display unit 201. At this time, driving of the printer drive unit 342 and the scanner drive unit 332 is restricted. Therefore, this activation involves no driving sound of the printer drive unit 342 and the scanner drive unit 332.

<Step S103>

The microcomputer 203 (or may be the CPU 301) flashes the power saving button 204 and the light source in the card reader 16 in order to prompt the user to the portion that should be operated.

<Step S104a>

The power supply control unit 304 determines whether the user has performed any operation input to the image forming apparatus 100 such as a touch operation on the buttons of the operation unit 12 or the display screen of the display unit 201. As a result of this determination, when the user has performed the operation input to the image forming apparatus 100, the process advances to step S108; otherwise, the process advances to step S104b.

<Step S104b>

The power supply control unit 304 determines whether user authentication has been performed in the card reader 16. As a result of this determination, when user authentication has been performed in the card reader 16, the process advances to step S108; otherwise, the process advances to step S104c.

<Step S104c>

When the ultrasonic sensor 15 detects the object at the short distance from the image forming apparatus 100, logic of the signal Q2 changes to Hi level. Therefore, when logic of the signal Q2 changes to Hi level, the power supply control unit 304 notifies the microcomputer 203 of this. The microcomputer 203 determines whether logic of the signal Q2 has changed to Hi level, that is, whether the ultrasonic sensor 15 has detected the person at the short distance. As a result of this determination, when the ultrasonic sensor 15 has detected the person at the short distance, the process advances to step S108; otherwise, the process advances to step S105.

<Step S105>

The CPU 301 measures, with its own timer (not shown), a time elapsed since the process shifts from step S103 to step S104a (a time elapsed since the image forming apparatus 100 shifts to the silent recovery state ST3). Therefore, the CPU 301 determines whether this time being measured has exceeded a predetermined time. As a result of this determination, if the time has exceeded the predetermined time, the process advances to step S106; otherwise, the process returns to step S104a.

<Step S106>

The power supply control unit 304 controls the signals C, D, E, F, H, and I to set the switches 512 to 516, 518, and 519 in the OFF state. As a result, power supply to the CPU 301, the HDD 308, the ROM 303, the touch panel 206, the display unit 201, the image processing unit 309, the printer unit 14, and the scanner unit 13 is cut off. As a result, the image forming apparatus 100 shifts to the power saving state ST4.

<Step S107>

The microcomputer 203 (or may be the CPU 301) turns off the power saving button 204 and the light source in the card reader 16.

<Step S108>

Since the microcomputer 203 outputs the signal G with its logic being at Hi level, the switch 517 changes to the ON state, energizing and thus turning on the backlight 207. As a result, the main menu screen 201a is displayed in the display unit 201.

<Step S109>

The microcomputer 203 (or may be the CPU 301) determines whether the user has selected the copy icon 211 in the main menu screen 201a displayed on the display screen of the display unit 201. As a result of this determination, when the user has selected the copy icon 211, the process advances to step S110; otherwise, the process advances to step S111.

<Step S110>

The printer control unit 341 and the scanner control unit 331, respectively, cancel the restrictions on driving of the printer drive unit 342 and the scanner drive unit 332 needed to execute the copy function. As a result, the standby state ST1 capable of executing the copy function is set.

<Step S111>

The microcomputer 203 (or may be the CPU 301) determines whether the user has selected the print icon 212 in the main menu screen 201a displayed on the display screen of the display unit 201. As a result of this determination, when the user has selected the print icon 212, the process advances to step S112; otherwise, the process advances to step S113.

<Step S112>

The printer control unit 341 cancels the restriction on driving of the printer drive unit 342 needed to execute the print function. As a result, the standby state ST1 capable of executing the print function is set.

<Step S113>

The microcomputer 203 (or may be the CPU 301) determines whether the user has selected the scan icon 213 in the main menu screen 201a displayed on the display screen of the display unit 201. As a result of this determination, when the user has selected the scan icon 213, the process advances to step S114; otherwise, the process returns to step S104a.

<Step S114>

The scanner control unit 331 cancels the restriction on driving of the scanner drive unit 332 needed to execute the scan function. As a result, the standby state ST1 capable of executing the scan function is set.

An example in which the user selects any of the copy icon 211, the print icon 212, and the scan icon 213 in the main menu screen 201a has been described. However, the same also applies to a case in which the user selects another icon. When the user selects another icon, power is supplied to the functional unit (for example, a FAX unit) needed to execute the function corresponding to the other selected icon. For example, when the user selects the FAX icon 215 in the main menu screen 201a, power is supplied to the scanner unit 13 needed to send a FAX.

An example of the arrangement of the ultrasonic sensor 15 will now be described with reference to FIG. 12. As shown in FIG. 12, the ultrasonic sensor 15 includes two sensors 121 and 122 each having the same arrangement. Each of the sensors 121 and 122 is an ultrasonic sensor having transmission and reception functions of the ultrasonic sensor alone.

The sensor 121 is a sensor configured to detect the object within a range (A1 in FIG. 1) of a predetermined distance D1 from the image forming apparatus 100 and outputs the signal Q1 indicating whether the object has been detected within the range of the distance D1 from the image forming apparatus 100.

The sensor 122 is a sensor configured to detect the object within a range of a predetermined distance D2 (<D1) from the image forming apparatus 100 and outputs the signal Q2 indicating whether the object has been detected within the range of the distance D2 from the image forming apparatus 100.

As described above, the sensors 121 and 122 are different in a distance to the object to be a detection target, but are the same in the arrangement for this. Therefore, the sensor 121 will be described below and the same description is also applied to the sensor 122.

Upon receiving a transmission trigger signal from a control unit 1205, a pulse signal generation unit 1201 generates a pulse-like transmission signal having an amplitude and a pulse width specified by the control unit 1205. The control unit 1205 stores information indicating the amplitude and the pulse width of the transmission signal generated in the pulse signal generation unit 1201. The control unit 1205 specifies the amplitude and the pulse width of the transmission signal for the pulse signal generation unit 1201 based on this stored information.

A transmitting unit 1202 converts the transmission signal (electrical signal) input from the pulse signal generation unit 1201 into an ultrasonic wave and outputs it. As a result, the ultrasonic wave is emitted from the sensor 121.

A receiving unit 1203 receives a reflected wave obtained when the ultrasonic wave output from the transmitting unit 1202 is reflected by a target object, converts the received reflected wave into the electrical signal, and outputs, to a waveform shaping unit 1204 at the subsequent stage, the converted electrical signal as a reception signal. Note that when the object or the person does not exist within a range where the ultrasonic wave output from the transmitting unit 1202 reaches, no reflected wave is generated. In this case, the receiving unit 1203 does not receive the reflected wave.

The waveform shaping unit 1204 shapes the reception signal received from the receiving unit 1203 into a pulse-like electrical signal by comparing the reception signal with a threshold specified by the control unit 1205 and outputs, to the control unit 1205, the shaped electrical signal as a reception pulse signal. The threshold to be used in the waveform shaping unit 1204 is set by the control unit 1205 and output to the waveform shaping unit 1204.

The control unit 1205 controls the operation of the sensor 121, and outputs the amplitude and the pulse width needed to generate the pulse-like transmission signal by the pulse signal generation unit 1201 and the threshold needed to perform the above-described shaping by the waveform shaping unit 1204. The control unit 1205 also outputs the signal Q1 upon receiving the reception pulse signal from the waveform shaping unit 1204.

Figure 13:
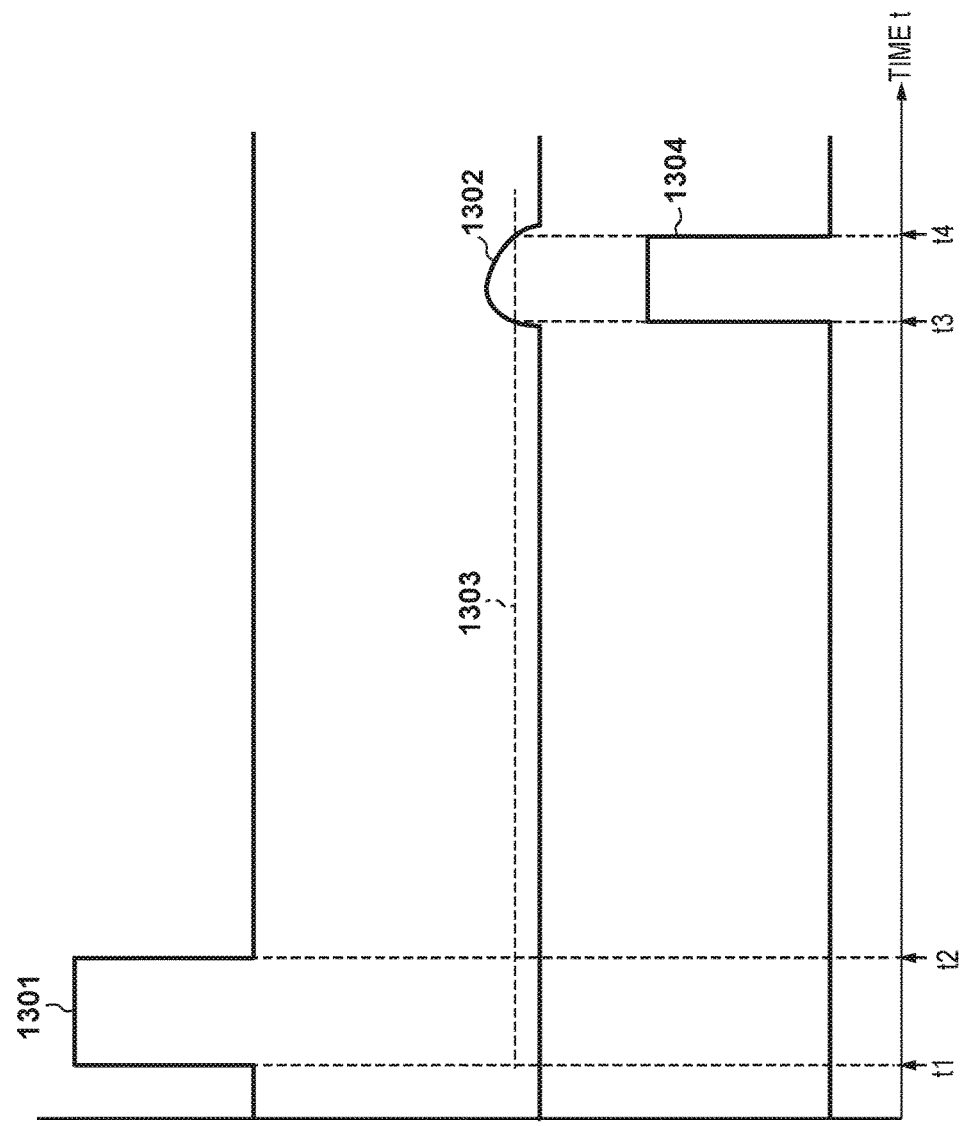
FIG. 13 is a timing chart showing an ultrasonic wave, a reflected wave, and a reception pulse signal.

A case in which the ultrasonic wave output from the transmitting unit 1202 is reflected by the object at a certain distance from the image forming apparatus 100 and the receiving unit 1203 receives the reflected wave will now be described with reference to FIG. 13. In FIG. 13, the abscissa represents time and the ordinate represents a waveform level. FIG. 13 shows an example of the waveforms of the pulse-like transmission signal (ultrasonic wave) generated in the pulse signal generation unit 1201, the reception signal (reflected wave) from the receiving unit 1203, and the reception pulse signal shaped by the waveform shaping unit 1204.

At the upper stage of FIG. 13, reference numeral 1301 represents a pulse-like transmission signal generated in the pulse signal generation unit 1201 by the transmission trigger signal output from the control unit 1205 and is output between t1 and t2. At the upper stage of FIG. 13, no waveform change is shown between t1 and t2. In practice, however, the transmission signal 1301 vibrates at a predetermined frequency (for example, 40 kHz) during a period from t1 to t2. The transmission signal 1301 is transmitted to the transmitting unit 1202 and output as the ultrasonic wave.

The middle stage of FIG. 13 shows an example of a reception signal obtained by converting a direct wave and the reflected wave received by the receiving unit 1203 into the electrical signal. At the middle stage of FIG. 13, reference numeral 1302 represents a reflected wave (reception signal) received by the receiving unit 1203 after the ultrasonic wave output from the transmitting unit 1202 is reflected by the object. The waveform of the reflected wave 1302 is attenuated while propagating through the air. Therefore, as compared with the ultrasonic wave output from the transmitting unit 1202, the reflected wave 1302 has a smaller amplitude and a time during which reflection is occurring also becomes shorter. Note that the reflected wave 1302 at the middle stage of FIG. 13 vibrates at the predetermined frequency (for example, 40 kHz) in a manner similar to the pulse-like transmission signal 1301. Reference numeral 1303 indicated by a broken line represents a threshold (a threshold for shaping the reception signal into the pulse-like electrical signal) supplied from the control unit 1205 to the waveform shaping unit 1204.

The lower stage of FIG. 13 shows an example of the reception pulse signal obtained by shaping the reflected wave 1302 by the waveform shaping unit 1204. Reference numeral 1304 at the lower stage of FIG. 13 represents a reflected wave (reception pulse signal) shaped by the waveform shaping unit 1204. The reflected wave 1304 is obtained by setting a portion where its waveform level value (a value on the ordinate) is smaller than the threshold 1303 in the reflected wave 1302 to 0 and a portion where its waveform level value (the value on the ordinate) is larger than the threshold 1303 in the reflected wave 1302 to a predetermined amplitude value W.

At the lower stage of FIG. 13, the reflected wave 1304 is output to the control unit 1205 between t3 and t4. Note that the reflected wave 1304 vibrates at the predetermined frequency (for example, 40 kHz) between t3 and t4 in a manner similar to the transmission signal 1301.

After obtaining the reflected wave 1304 at the lower stage of FIG. 13, the control unit 1205 outputs the signal Q1 at Hi. That is, the control unit 1205 determines that the object has been detected if the amplitude value of the shaped reflected wave equals to the predetermined amplitude value W and outputs the signal Q1 at Hi in order to notify of this. On the other hand, when there is no portion where the waveform level value (the value on the ordinate) is larger than the threshold 1303 in the reflected wave 1302, the waveform level value of the shaped reflected wave will be 0. When receiving such a shaped reflected wave, the control unit 1205 determines that the object has not been detected and outputs the signal Q1 at Low in order to notify of this.

The sensor 122 also operates in a manner similar to the sensor 121. However, the threshold 1303 used by the sensor 122 is larger than the threshold used by the sensor 121. This will be described in detail with reference to FIG. 14.

Figure 14:
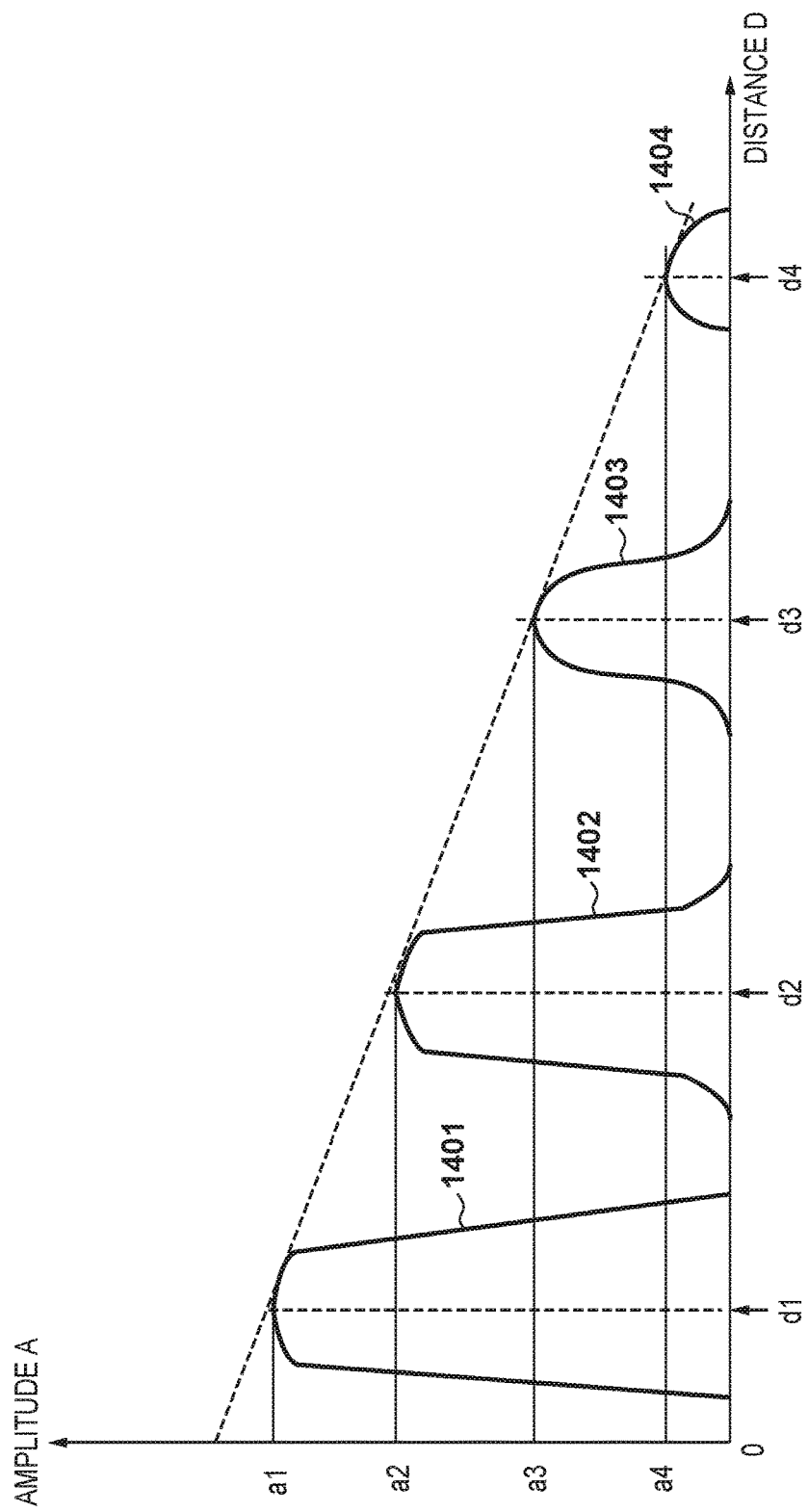
FIG. 14 is a chart showing the relationship between an amplitude A of the reflected wave and a distance D from the ultrasonic sensor 15 to a reflective object.

The relationship between the amplitude A of the reflected wave received by the receiving unit 1203 and a distance D from the ultrasonic sensor 15 to the reflective object will now be described with reference to FIG. 14. In FIG. 14, the ordinate represents the amplitude A of the reflected wave and the abscissa represents the distance D from the ultrasonic sensor 15 to the reflective object.

FIG. 14 shows, as an example of the waveform of the reflected wave, waveforms 1401 to 1404 whose distances from the ultrasonic sensor 15 to the reflective object are d1, d2, d3, and d4 (d1<d2<d3<d4), respectively. The attenuation amount of the ultrasonic wave increases as the ultrasonic wave propagates through the air for longer distances. Therefore, the magnitudes of respective amplitudes a1, a2, a3, and a4 of the waveforms 1401 to 1404 satisfy a1>a2>a3>a4.

At this time, if a low value, for example, a4 in FIG. 14 is set as the threshold used by the sensor 121, only the amplitude of the reflected wave from the object at a position closer from the ultrasonic sensor 15 than the distance d4 exceeds a4. Therefore, if a4 in FIG. 14 is set as the threshold, the control unit 1205 outputs the signal Q1 at Hi only when the object exists at the position closer from the ultrasonic sensor 15 than the distance d4. In this case, the control unit 1205 outputs the signal Q1 at Low when the object exists at a position farther from the ultrasonic sensor 15 than the distance d4.

If a high value, for example, a2 in FIG. 14 is set as the threshold used by the sensor 122, only the amplitude of the reflected wave from the object at a position closer from the ultrasonic sensor 15 than the distance d2 exceeds a2. Therefore, if a2 in FIG. 14 is set as the threshold, the control unit of the sensor 122 outputs the signal Q2 at Hi only when the object exists at the position closer from the ultrasonic sensor 15 than the distance d2. In this case, the control unit of the sensor 122 outputs the signal Q2 at Low when the object exists at a position farther from the ultrasonic sensor 15 than the distance d2.

As described above, it is possible, by using the ultrasonic sensor 15 which includes the sensors 121 and 122 each having the different set threshold, to perform power supply control of the image forming apparatus 100 in accordance with whether the object exists within the first distance from the ultrasonic sensor 15 or whether the object exists within the second distance shorter than the first distance from the ultrasonic sensor 15.

[Second Embodiment]

In the first embodiment, the two sensors 121 and 122 are used to output the signal Q1 and the signal Q2. In this embodiment, one sensor is used to generate and output a signal Q1 and a signal Q2. The difference from the first embodiment will mainly be described below. The rest is the same as in the first embodiment unless otherwise specified.

Figure 15:
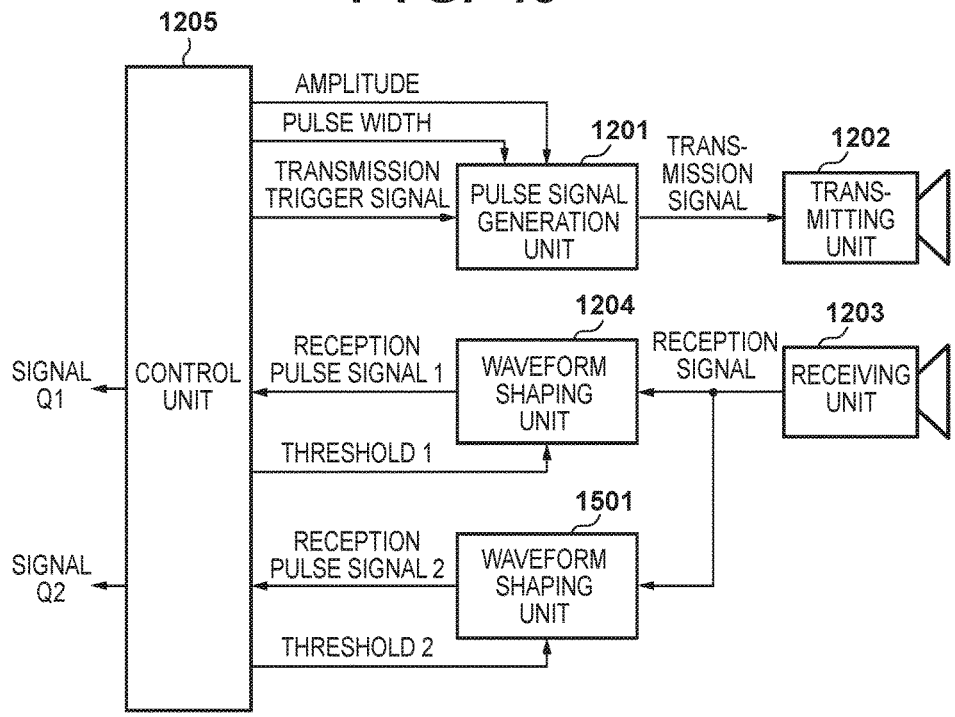
FIG. 15 is a diagram showing an example of the arrangement of an ultrasonic sensor 15.

FIG. 15 shows an example of the arrangement of an ultrasonic sensor 15 according to this embodiment. Referring to FIG. 15, the same functional units as those shown in FIG. 12 are denoted by the same reference numerals, and a description of the functional units will be omitted.

While a waveform shaping unit 1501 operates in a manner similar to a waveform shaping unit 1204, a control unit 1205 supplies, to the waveform shaping unit 1501, a threshold different from that in the waveform shaping unit 1204. The control unit 1205 supplies threshold 1 to the waveform shaping unit 1204. The waveform shaping unit 1204 outputs a shaped reflected wave (reception pulse signal 1) to the control unit 1205 by performing the operation described in the first embodiment. The control unit 1205 supplies threshold 2 to the waveform shaping unit 1501. The waveform shaping unit 1501 outputs a shaped reflected wave (reception pulse signal 2) to the control unit 1205 by operating in the manner similar to the waveform shaping unit 1204 using threshold 2. The control unit 1205 supplies, for example, the value of a4 in FIG. 14 as threshold 1 to the waveform shaping unit 1204 and the value of a2 in FIG. 14 as threshold 2 to the waveform shaping unit 1501.

Note that both of the waveform shaping units 1204 and 1501 obtain each reflected wave, as the shaped reflected wave, by setting a portion where its waveform level value is smaller than a threshold in the reflected wave to 0 and a portion where its waveform level value is larger than the threshold in the reflected wave to a predetermined amplitude value W.

At this time, the control unit 1205 determines that an object has been detected if the amplitude value of reception pulse signal 1 equals to the amplitude value W (the amplitude value of the reflected wave is larger than threshold 1) and outputs the signal Q1 at Hi in order to notify of this. On the other hand, the control unit 1205 determines that the object has not been detected if the amplitude value of reception pulse signal 1 is smaller than the amplitude value W (the amplitude value of the reflected wave is less than threshold 1) and outputs the signal Q1 at Low in order to notify of this.

Also, the control unit 1205 determines that the object has been detected if the amplitude value of reception pulse signal 2 equals to the amplitude value W (the amplitude value of the reflected wave is larger than threshold 2) and outputs the signal Q2 at Hi in order to notify of this. On the other hand, the control unit 1205 determines that the object has not been detected if the amplitude value of reception pulse signal 2 is smaller than the amplitude value W (the amplitude value of the reflected wave is less than threshold 2) and outputs the signal Q2 at Low in order to notify of this.

As described above, in this embodiment, it is possible for the ultrasonic sensor 15 to generate and output the above-described signal Q1 and signal Q2 not by two sensors but by the waveform shaping units having different set thresholds.

[Third Embodiment]

In the second embodiment, the ultrasonic sensor 15 is formed by using two waveform shaping units using different thresholds, and the respective waveform shaping units generate and output the signal Q1 and the signal Q2. In this embodiment, one waveform shaping unit and one threshold generate and output a signal Q1 and a signal Q2 by changing a threshold in accordance with whether the amplitude of a shaped reflected wave exceeds the threshold.

Figure 16:
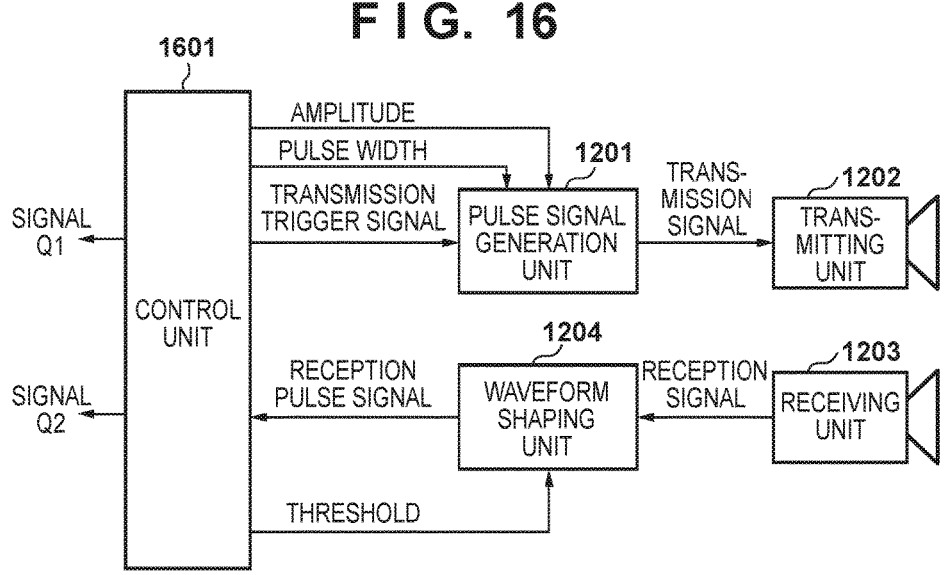
FIG. 16 is a diagram showing an example of the arrangement of an ultrasonic sensor 15.

An example of the arrangement of an ultrasonic sensor 15 according to this embodiment will be described with reference to FIG. 16. Referring to FIG. 16, the same functional units as those shown in FIG. 12 are denoted by the same reference numerals, and a description of the functional units will be omitted.

A control unit 1601 controls the operation of a pulse signal generation unit 1201 as in the first and second embodiments. However, the control unit 1601 controls the operation of a waveform shaping unit 1204 differently from the first and second embodiments. The control unit 1601 sets a predetermined threshold for the waveform shaping unit 1204 in advance and controls the threshold based on, for example, the amplitude of the shaped reflected wave output from the waveform shaping unit 1204.

A process performed by the control unit 1601 will be described with reference to FIG. 17 showing a flowchart of the same process. In order to make a detailed description below, assume that, as an example, the relationship between the distance and the threshold has a relationship shown in FIG. 14.

<Step S1701>

The control unit 1601 outputs, to the waveform shaping unit 1204, the value of a4 shown in FIG. 14 as the threshold. Therefore, the waveform shaping unit 1204 sets the value of a4 output from the control unit 1601 as a threshold to be used in the subsequent process. The control unit 1601 outputs the signal Q1 at Low and outputs the signal Q2 at Low.

<Step S1702>

The control unit 1601 outputs a transmission trigger signal to the pulse signal generation unit 1201. Upon receiving the transmission trigger signal from the control unit 1601, the pulse signal generation unit 1201 generates a pulse-like transmission signal having an amplitude and a pulse width specified by the control unit 1601. Then, a transmitting unit 1202 converts the transmission signal (electrical signal) input from the pulse signal generation unit 1201 into an ultrasonic wave and outputs it. As a result, the ultrasonic wave is emitted from the ultrasonic sensor 15.

<Step S1703>

A receiving unit 1203 receives a reflected wave obtained when the ultrasonic wave output from the transmitting unit 1202 is reflected by a target object, converts the received reflected wave into the electrical signal, and outputs, to the waveform shaping unit 1204 at the subsequent stage, the converted electrical signal as a reception signal. Then, the waveform shaping unit 1204 shapes the reception signal received from the receiving unit 1203 into a pulse-like electrical signal by comparing the reception signal with a threshold specified by a control unit 1205 and outputs, to the control unit 1601, the shaped electrical signal as a reception pulse signal.

The control unit 1601 determines whether the amplitude of the reception pulse signal is less than the amplitude value W (the amplitude of the reflected wave is less than the threshold). If the amplitude of the reception pulse signal equals to the amplitude value W, the process advances to step S1704. If the amplitude of the reception pulse signal is less than the amplitude value W, the process advances to step S1709.

<Step S1704>
The control unit 1601 outputs the signal Q1 at Hi.
<Step S1705>
The control unit 1601 determines whether the threshold currently set for the waveform shaping unit 1204 is less than a threshold a2. As a result of this determination, if the threshold currently set for the waveform shaping unit 1204 is equal to or larger than the threshold a2 (equal to or larger than a predetermined value), the process advances to step S1708; otherwise, the process advances to step S1706.
<Step S1706>
The control unit 1601 obtains, as a new threshold, a value by adding (increasing) predetermined Δa to the threshold currently set for the waveform shaping unit 1204 and outputs the obtained threshold to the waveform shaping unit 1204. The waveform shaping unit 1204 sets the value of the new threshold output from the control unit 1601 as a threshold to be used in the subsequent process.
<Step S1707>
The control unit 1601 determines whether an operation termination condition has been met. The control unit 1601 determines that the operation termination condition has been met when, for example, a CPU 301 issues, triggered by execution of a shutdown process, an operation termination instruction. As a result of this determination, if the operation termination condition has been met, the control unit 1601 terminates the process according to the flowchart of FIG. 17; otherwise, the process returns to step S1702.
<Step S1708>
The control unit 1601 outputs the signal Q2 at Hi.
<Step S1709>
The control unit 1601 determines whether the number of times the reception pulse signal having the amplitude equal to the amplitude value W (the amplitude of the reflected wave is larger than the threshold) is not input continuously exceeds a predetermined count. As a result of this determination, when the control unit 1601 determines that the predetermined count is exceeded, the process advances to step S1710; otherwise, the process advances to step S1707.

Note that in step S1709, the control unit 1601 may determine whether the length of a period in which the reception pulse signal having the amplitude equal to the amplitude value W is not input exceeds a predetermined length instead of determining whether the number of times the reception pulse signal having the amplitude equal to the amplitude value W is not input continuously exceeds the predetermined count. Also in making this determination, the process advances to step S1710 when the control unit 1601 determines that the predetermined length is exceeded and the process advances to step S1707 when the control unit 1601 determines that the predetermined length is not exceeded.
<Step S1710>
The control unit 1601 determines that the object does not exist in the detection area of the ultrasonic sensor 15 (or moves outside the detection area), and outputs the signal Q1 and the signal Q2 at Low.
<Step S1711>
The control unit 1601 outputs the threshold a4 to the waveform shaping unit 1204. The waveform shaping unit 1204 sets the value of the threshold a4 output from the control unit 1601 as the threshold to be used in the subsequent process.

Note that in the first to third embodiments, a condition that "the number of times the reception pulse signal having the amplitude equal to the amplitude value W (the amplitude of the reflected wave is larger than the threshold) is input continuously is equal to or larger than a predetermined count" may be added to a condition for outputting the signal Q2 at Hi. Instead of this condition, a condition that "the length of a period in which the reception pulse signal having the amplitude equal to the amplitude value W (the amplitude of the reflected wave is larger than the threshold) is equal to or larger than a predetermined length" may be added.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-014558, filed Jan. 28, 2015, which is hereby incorporated by reference herein in its entirety.

What is claimed is:

1. An image forming apparatus, comprising:
an ultrasonic sensor which outputs an ultrasonic wave and receives a reflected wave of the output ultrasonic wave;
a return button which receives a user operation for shifting the image forming apparatus from a first power state to a second power state in which power consumption is higher than power consumption in the first power state;
a light emitter which is arranged adjacent to the return button; and
a controller configured to:
(i) switch an emission state of the light emitter based on a result of a comparison between an amplitude of a signal, corresponding to the reflected wave, output from the ultrasonic sensor and a first threshold, and
(ii) shift the image forming apparatus from the first power state to the second power state based on a result of a comparison between the amplitude of the signal and a second threshold which is larger than the first threshold.

2. The apparatus according to claim 1, wherein the controller is further configured to control the light emitter to be flashed based on the amplitude of the signal being larger than the first threshold.

3. The apparatus according to claim 1, wherein the return button is further configured to receive a user operation for shifting the image forming apparatus from the second power state to the first power state.

4. The apparatus according to claim 1, wherein the image forming apparatus has at least one of a print function, a copy function, and a scan function.

5. The apparatus according to claim 1, wherein, the controller is further configured to set the first and second thresholds as thresholds to be compared with the amplitude of the signal output from the ultrasonic sensor.

6. A control method of an image forming apparatus, the method comprising:
    outputting an ultrasonic wave from an ultrasonic sensor;
    receiving, at the ultrasonic sensor, a reflected wave of the output ultrasonic wave;
    receiving, by a return button a user operation for shifting the image forming apparatus from a first power state to a second power state in which power consumption is higher than power consumption in the first power state,
    wherein a light emitter is arranged adjacent to the return button; and
    switching, by a controller, an emission state of the light emitter based on a result of a comparison between an amplitude of a signal, corresponding to the reflected wave, output from the ultrasonic sensor and a first threshold; and
    shifting, by the controller, the image forming apparatus from the first power state to the second power state based on a result of a comparison between the amplitude of the signal and a second threshold which is larger than the first threshold.

7. An image forming apparatus, comprising:
    an ultrasonic sensor which outputs an ultrasonic wave and receives a reflected wave of the output ultrasonic wave;
    a card reader which reads a card storing authentication information;
    a light emitter which is arranged adjacent to the card reader; and
    a controller configured to:
        (i) switch an emission state of the light emitter based on a result of a comparison between an amplitude of a signal, corresponding to the reflected wave, output from the ultrasonic sensor and a first threshold, and
        (ii) shift the image forming apparatus from a first power state to a second power state, in which power consumption is higher than power consumption in the first power state based on a result of a comparison between the amplitude of the signal and a second threshold which is larger than the first threshold.

8. The apparatus according to claim 7, wherein the controller is further configured to control the light emitter to be flashed based on the amplitude of the signal being larger than the first threshold.

9. The apparatus according to claim 7, wherein the image forming apparatus has at least one of a print function, a copy function, and a scan function.

10. A control method of image forming apparatus, the method comprising:
    outputting, by an ultrasonic sensor, an ultrasonic wave;
    receiving, by the ultrasonic sensor, a reflected wave of the output ultrasonic wave;
    reading, by a card reader, authentication information stored in a card, wherein the card reader is adjacent to a light emitter;
    switching, by a controller, an emission state of the light emitter based on a result of a comparison between an amplitude of a signal, corresponding to the reflected wave, output from the ultrasonic sensor and a first threshold; and
    shifting, by the controller, the image forming apparatus from a first power state to a second power state, in which power consumption is higher than power consumption in the first power state based on a result of a comparison between the amplitude of the signal and a second threshold which is larger than the first threshold.

* * * * *